(12) United States Patent
Niitsuma et al.

(10) Patent No.: US 8,460,630 B2
(45) Date of Patent: Jun. 11, 2013

(54) METHOD AND APPARATUS FOR PRODUCING HYDROGEN AND RECOVERING CARBON DIOXIDE

(75) Inventors: Takuya Niitsuma, Yokohama (JP);
Shunsuke Maekawa, Yokohama (JP);
Yoshihiro Kobori, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 555 days.

(21) Appl. No.: 12/593,847

(22) PCT Filed: Mar. 27, 2008

(86) PCT No.: PCT/JP2008/055818
§ 371 (c)(1),
(2), (4) Date: Sep. 29, 2009

(87) PCT Pub. No.: WO2008/123337
PCT Pub. Date: Oct. 16, 2008

(65) Prior Publication Data
US 2010/0129284 A1 May 27, 2010

(30) Foreign Application Priority Data

| Mar. 29, 2007 | (JP) | 2007-087966 |
| Mar. 29, 2007 | (JP) | 2007-088157 |
| May 7, 2007 | (JP) | 2007-122380 |

(51) Int. Cl.
| B01J 7/00 | (2006.01) |
| C01B 31/20 | (2006.01) |
| C01B 3/02 | (2006.01) |
| C01B 3/22 | (2006.01) |
| C01B 3/24 | (2006.01) |
| C01B 3/26 | (2006.01) |

(52) U.S. Cl.
USPC ......... 423/437.1; 48/61; 422/187; 423/648.1; 423/650; 423/651; 423/652

(58) Field of Classification Search
USPC .................. 423/437.1, 648.1, 650, 651, 652, 423/653, 654; 48/61; 422/187
See application file for complete search history.

(56) References Cited

U.S. PATENT DOCUMENTS

| 3,430,418 A | * | 3/1969 | Wagner | 95/100 |
| 4,229,188 A | | 10/1980 | Intille | |

(Continued)

FOREIGN PATENT DOCUMENTS

| EP | 0262894 A2 | 4/1988 |
| EP | 0341879 A1 | 11/1989 |

(Continued)

OTHER PUBLICATIONS

International Search Report dated Jun. 24, 2008.

(Continued)

*Primary Examiner* — Wayne Langel
(74) *Attorney, Agent, or Firm* — Fitch, Even, Tabin & Flannery, LLP

(57) ABSTRACT

When the production of hydrogen and the recovery of carbon dioxide are simultaneously performed by using as a raw material a carbon-containing fuel, the increase of the system cost is suppressed and the efficiency is improved. Disclosed is a method for producing hydrogen and recovering carbon dioxide which method produces hydrogen from a carbon-containing fuel and recovers carbon dioxide, including: a hydrogen-containing gas producing step of obtaining a hydrogen-containing gas that contains hydrogen and carbon dioxide by reforming a carbon-containing fuel; a PSA step of separating, by using a pressure swing adsorption apparatus, the hydrogen-containing gas into a first hydrogen-enriched gas that is a gas enriched in hydrogen and a PSA offgas that is a gas enriched in the components other than hydrogen; and a step of obtaining, by treating the PSA offgas with a hydrogen separation membrane and a carbon dioxide separation membrane, a second hydrogen-enriched gas that is a gas enriched in hydrogen and a carbon dioxide-enriched gas that is a gas enriched in carbon dioxide. Also disclosed is an apparatus for embodying the method.

22 Claims, 6 Drawing Sheets

U.S. PATENT DOCUMENTS

| | | | |
|---|---|---|---|
| 4,238,204 A | | 12/1980 | Perry |
| 4,553,981 A | * | 11/1985 | Fuderer .................. 48/62 R |
| 4,778,670 A | * | 10/1988 | Pinto .................. 423/650 |
| 4,836,833 A | | 6/1989 | Nicholas et al. |
| 4,913,709 A | | 4/1990 | Kumar |
| 5,112,590 A | | 5/1992 | Krishnamurthy et al. |
| 5,354,547 A | * | 10/1994 | Rao et al. .................. 423/650 |
| 5,435,836 A | | 7/1995 | Anand et al. |
| 5,669,960 A | | 9/1997 | Couche |
| 5,753,010 A | | 5/1998 | Sircar et al. |
| 6,500,241 B2 | | 12/2002 | Reddy |
| 6,589,303 B1 | * | 7/2003 | Lokhandwala et al. . 48/197 FM |
| 7,550,635 B2 | * | 6/2009 | Tio .................. 585/250 |
| 7,572,432 B2 | * | 8/2009 | Gudlavalleti et al. ......... 423/650 |
| 7,670,587 B2 | * | 3/2010 | Porter et al. .................. 423/652 |
| 7,846,413 B2 | * | 12/2010 | Clomburg et al. ......... 423/437.1 |
| 8,282,907 B2 | * | 10/2012 | Doshi et al. .................. 423/648.1 |
| 2002/0114747 A1 | * | 8/2002 | Marchand et al. ............ 422/198 |
| 2002/0146359 A1 | * | 10/2002 | Lomax et al. .................. 422/198 |
| 2003/0223931 A1 | * | 12/2003 | Narayan .................. 423/651 |
| 2007/0269690 A1 | * | 11/2007 | Doshi et al. .................. 429/19 |
| 2008/0241059 A1 | * | 10/2008 | Peng et al. .................. 423/652 |
| 2009/0117024 A1 | | 5/2009 | Weedon et al. |

FOREIGN PATENT DOCUMENTS

| | | |
|---|---|---|
| EP | 0595100 A1 | 5/1994 |
| JP | S56-051223 A | 5/1981 |
| JP | S59-069415 A | 4/1984 |
| JP | H01-246103 | 10/1989 |
| JP | S60-99035 A | 4/1994 |
| JP | 2003081605 A | 3/2003 |
| JP | 2004519538 T | 7/2004 |
| JP | 2004292240 A | 10/2004 |
| WO | WO 00/27505 | 5/2000 |
| WO | WO 2006/050531 A2 | 5/2006 |
| WO | WO 2006/097703 | 9/2006 |

OTHER PUBLICATIONS

Powell, Clem E., et al., Polymeric $CO_2/N_2$ Gas Separation Membranes for the Capture of Carbon Dioxide from Power Plant Flue Gases, Journal of Membrane Science 279, 2006, pp. 1-49.

Heisei 15, Accomplishment Reports on Key Technology Research and Development Programs of Molecular Gate Functionalized Membrane for $CO_2$ Separation, pp. 1-145.

Extended European Search Report dated Aug. 22, 2011, corresponding with European Patent Application 11170141.3.

European Search Report, dated Dec. 3, 2010.

* cited by examiner

METHOD AND APPARATUS FOR PRODUCING HYDROGEN AND RECOVERING CARBON DIOXIDE

CROSS-REFERENCE TO RELATED APPLICATIONS

This is a U.S. National Phase of International Application PCT/JP2008/055818, filed Mar. 27, 2008, and claims the benefit of priority under 35 U.S.C. §119 based on Japanese Application Nos. JP2007-0122380, filed May 7, 2007; JP 2007-0088157, filed Mar. 29, 2007; and JP2007-0087966, filed Mar. 29, 2007, the entire disclosures of which applications are hereby incorporated herein by reference.

TECHNICAL FIELD

The present invention relates to a method and an apparatus for producing hydrogen from carbon-containing fuels such as fossil fuels and at the same time recovering carbon dioxide.

BACKGROUND ART

Hydrogen is expected as a future energy medium, and accordingly active researches and developments are being performed on wide technical fields including the production, storage and transportation, and utilization of hydrogen. The advantages provided by the use of hydrogen as an energy medium include high energy utilization efficiency, and additionally the fact that the emission after combustion is limited to water.

As matters stand, fossil fuels such as petroleum, coal and natural gas account for about 80% of the primary energy; in the future the proportion of the fossil fuels will be gradually decreased due to the increasing use of renewable energy, but, even so, it is anticipated that the proportion of the fossil fuels will remain at a high level. Accordingly, it can be said that in the production of hydrogen, the importance of the route in which the fossil fuels are used as the raw materials for the source of the primary energy is not diminished for the time being.

However, when hydrogen is produced by using a carbon-containing fuel such as a fossil fuel, $CO_2$ is emitted.

For the purpose of preventing the global warming, the reduction of the $CO_2$ emission is said to be an urgent and important issue. Under such circumstances, a technique for separating and recovering the $CO_2$ by-produced when hydrogen is produced from a fossil fuel is important as a technique capable of coping with both the reduction of the $CO_2$ emission and the early realization of the hydrogen-dependent society.

There have hitherto been known the methods for separating $CO_2$ when hydrogen is produced by using as a raw material a carbon-containing fuel such as a fossil fuel.

As a first method of such methods, a method may be quoted in which high-purity hydrogen is obtained with a pressure swing adsorption (PSA) apparatus from a mixture composed of hydrogen, CO, $CO_2$ and methane produced by using as a raw material a fossil fuel through steam reforming and shift reaction, and on the other hand, $CO_2$ is highly purified, and separated and recovered with a chemical absorption method from the impurity-containing offgas. However, it can not be said that this method is excellent from the viewpoint of the energy efficiency of the hydrogen production because of the reasons including the fact that in the chemical absorption method that uses as the absorption solution an organic amine solution, a large amount of energy is required in the step of recovering $CO_2$, namely, the step of regenerating the absorption solution.

As a second method, Patent Document 1 discloses a method in which in a process for purifying and separating individual gases with a two-stage purification apparatus, a $CO_2$ concentrating apparatus is disposed in the first stage to yield a gas flow mainly composed of $CO_2$, a PSA apparatus disposed in the second stage treats the gas discharged with a reduced $CO_2$ concentration from the $CO_2$ concentrating apparatus to yield high-purity hydrogen, and at the same time, $CO_2$ is liquefied and separated from the $CO_2$-enriched gas streams obtained from the respective stages. However, the energy efficiency of this method tends to be low because for the purpose of removing $CO_2$ from the gas, before the separation of hydrogen, containing hydrogen in a large amount, it is inevitably required to adopt a method in which the $CO_2$ recovery apparatus has an extremely high selectivity and is generally large in energy consumption.

As a third method, Patent Documents 2 and 3 disclose a process in which high-purity hydrogen is produced with a hydrogen purification apparatus such as a PSA apparatus, and at the same time, the offgas containing $CO_2$, hydrogen and the like is combusted and thereafter $CO_2$ is recovered. However, in this method, the offgas from the hydrogen purification apparatus, which gas still contains hydrogen in a large amount, is combusted to thereby reduce the hydrogen yield. Further, when air is used in the combustion, the load on the $CO_2$ recovery is large, because nitrogen is present. Alternatively, pure oxygen can be used for combustion; however, in this case, a large amount of energy is consumed for the production of pure oxygen and hence the energy efficiency tends to be low.

As a fourth method, Patent Document 4 discloses a method that uses a PSA apparatus having a serial configuration composed of two or more adsorption towers different from each other in adsorption selectivity. However, the absorption-regeneration cycle of this system is extremely complicated, and hence, it is difficult for this method to suppress the increase of the system cost.

As a fifth method, Patent Documents 5 and 6 disclose a method in which hydrogen is separated from the PSA offgas by using a membrane and the thus separated hydrogen is reused by recycling the thus separated hydrogen to the inlet of the PSA apparatus. According to these documents, however, $CO_2$ is discarded without being recovered, and no description on the treatment method of $CO_2$ such as a concentrating method is found in these documents.

Patent Document 1: Japanese National Publication of International Patent Applications No. 2004-519538

Patent Document 2: Japanese Patent Laid-Open No. 2004-292240

Patent Document 3: Japanese Patent Laid-Open No. 2003-81605

Patent Document 4: U.S. Pat. No. 4,913,709

Patent Document 5: U.S. Pat. No. 4,229,188

Patent Document 6: U.S. Pat. No. 5,435,836

DISCLOSURE OF THE INVENTION

Problems to be Solved by the Invention

As described above, in the method in which high-purity hydrogen as well as high-concentration $CO_2$ suitable for storage is produced, there is room for further improvement.

An object of the present invention is to provide a method and an apparatus which are capable of suppressing the increase of the system cost and are more efficient when the production of hydrogen and the recovery of carbon dioxide are simultaneously performed by using as a raw material a carbon-containing fuel.

Means for Solving the Problems

According to the present invention, the following method and apparatus are provided.

A method for producing hydrogen and recovering carbon dioxide which method produces hydrogen from a carbon-containing fuel and recovers carbon dioxide, the method including:

a hydrogen-containing gas producing step of obtaining a hydrogen-containing gas that contains hydrogen and carbon dioxide by reforming a carbon-containing fuel;

a PSA step of separating the hydrogen-containing gas by using a pressure swing adsorption apparatus into a first hydrogen-enriched gas that is a gas enriched in hydrogen and a PSA offgas that is a gas enriched in the components other than hydrogen; and a step of obtaining, by treating the PSA offgas with the use of a hydrogen separation membrane and a carbon dioxide separation membrane, a second hydrogen-enriched gas that is a gas enriched in hydrogen and a carbon dioxide-enriched gas that is a gas enriched in carbon dioxide.

An apparatus for producing hydrogen and recovering carbon dioxide which apparatus produces hydrogen from a carbon-containing fuel and recovers carbon dioxide, the apparatus including:

a hydrogen-containing gas producing apparatus for obtaining a hydrogen-containing gas that contains hydrogen and carbon dioxide by reforming a carbon-containing fuel;

a pressure swing adsorption apparatus for separating the hydrogen-containing gas into a first hydrogen-enriched gas that is a gas enriched in hydrogen and a PSA offgas that is a gas enriched in the components other than hydrogen; and a hydrogen separation membrane and a carbon dioxide separation membrane for obtaining, by treating the PSA offgas, a second hydrogen-enriched gas that is a gas enriched in hydrogen and a carbon dioxide-enriched gas that is a gas enriched in carbon dioxide.

Additionally, the methods and the apparatuses according to an aspect (aspect A) of the present invention are provided.

(A1) A method for producing hydrogen and recovering carbon dioxide which method produces hydrogen from a carbon-containing fuel and recovers carbon dioxide, the method including:

a hydrogen-containing gas producing step of obtaining a hydrogen-containing gas that contains hydrogen and carbon dioxide by reforming a carbon-containing fuel;

a PSA step of separating the hydrogen-containing gas by using a pressure swing adsorption apparatus into a first hydrogen-enriched gas that is a gas enriched in hydrogen and a PSA offgas that is a gas enriched in the components other than hydrogen;

a carbon dioxide membrane-separating step of separating the PSA offgas with the use of a carbon dioxide separation membrane into a carbon dioxide-enriched gas that is a gas enriched in carbon dioxide and a carbon dioxide separation membrane offgas that is a gas enriched in the components other than carbon dioxide; and a hydrogen membrane-separating step of separating the carbon dioxide separation membrane offgas with the use of a hydrogen separation membrane into a second hydrogen-enriched gas that is a gas enriched in hydrogen and a hydrogen separation membrane offgas that is a gas enriched in the components other than hydrogen.

(A2) The method according to (A1), including a step of obtaining liquefied carbon dioxide by liquefying the carbon dioxide-enriched gas.

(A3) The method according to (A1) or (A2), including a step of recycling the second hydrogen-enriched gas to the hydrogen-containing gas producing step or to the PSA step.

(A4) The method according to any one of (A1) to (A3), wherein the ratio α of the carbon dioxide permeability coefficient to the hydrogen permeability coefficient of the carbon dioxide separation membrane is 5 or more.

(A5) An apparatus for producing hydrogen and recovering carbon dioxide which apparatus produces hydrogen from a carbon-containing fuel and recovers carbon dioxide, the apparatus including:

a hydrogen-containing gas producing apparatus for obtaining a hydrogen-containing gas that contains hydrogen and carbon dioxide by reforming a carbon-containing fuel;

a pressure swing adsorption apparatus for separating the hydrogen-containing gas into a first hydrogen-enriched gas that is a gas enriched in hydrogen and a PSA offgas that is a gas enriched in the components other than hydrogen;

a carbon dioxide separation membrane for separating the PSA offgas into a carbon dioxide-enriched gas that is a gas enriched in carbon dioxide and a carbon dioxide separation membrane offgas that is a gas enriched in the components other than carbon dioxide; and a hydrogen separation membrane for separating the carbon dioxide separation membrane offgas into a second hydrogen-enriched gas that is a gas enriched in hydrogen and a hydrogen separation membrane offgas that is a gas enriched in the components other than hydrogen.

(A6) The apparatus according to (A5), including a carbon dioxide liquefier for obtaining liquefied carbon dioxide by liquefying the carbon dioxide-enriched gas.

(A7) The apparatus according to (A5) or (A6), including a recycle line for recycling the second hydrogen-enriched gas to the hydrogen-containing gas producing step or to the PSA step.

(A8) The apparatus according to any one of (A5) to (A7), wherein the ratio α of the carbon dioxide permeability coefficient to the hydrogen permeability coefficient of the carbon dioxide separation membrane is 5 or more.

Additionally, the methods and the apparatuses according to another aspect (aspect B) of the present invention are provided.

(B1) A method for producing hydrogen and recovering carbon dioxide which method produces hydrogen from a carbon-containing fuel and recovers carbon dioxide, the method including:

a hydrogen-containing gas producing step of obtaining a hydrogen-containing gas that contains hydrogen and carbon dioxide by reforming a carbon-containing fuel;

a PSA step of separating the hydrogen-containing gas by using a pressure swing adsorption apparatus into a first hydrogen-enriched gas that is a gas enriched in hydrogen and a PSA offgas that is a gas enriched in the components other than hydrogen;

a hydrogen membrane-separating step of separating the PSA offgas with the use of a hydrogen separation membrane into a second hydrogen-enriched gas that is a gas enriched in hydrogen and a hydrogen separation membrane offgas that is a gas enriched in the components other than hydrogen; and a carbon dioxide membrane-separating step of separating the hydrogen separation membrane offgas with the use of a carbon dioxide separation membrane into a carbon dioxide-enriched gas that is a gas enriched in carbon dioxide and a carbon dioxide separation membrane offgas that is a gas enriched in the components other than carbon dioxide.

(B2) The method according to (B1), including a step of obtaining liquefied carbon dioxide by liquefying the carbon dioxide-enriched gas.

(B3) The method according to (B1) or (B2), including a step of recycling the second hydrogen-enriched gas to the hydrogen-containing gas producing step or to the PSA step.

(B4) The method according to any one of (B1) to (B3), wherein the ratio α of the carbon dioxide permeability coefficient to the hydrogen permeability coefficient of the carbon dioxide separation membrane is 5 or more.

(B5) The method according to any one of (B1) to (B4), wherein the ratio α of the carbon dioxide permeability coefficient to the hydrogen permeability coefficient of the carbon dioxide separation membrane is 100 or less.

(B6) An apparatus for producing hydrogen and recovering carbon dioxide which apparatus produces hydrogen from a carbon-containing fuel and recovers carbon dioxide, the apparatus including:

a hydrogen-containing gas producing apparatus for obtaining a hydrogen-containing gas that contains hydrogen and carbon dioxide by reforming a carbon-containing fuel;

a pressure swing adsorption apparatus for separating the hydrogen-containing gas into a first hydrogen-enriched gas that is a gas enriched in hydrogen and a PSA offgas that is a gas enriched in the components other than hydrogen;

a hydrogen separation membrane for separating the PSA offgas into a second hydrogen-enriched gas that is a gas enriched in hydrogen and a hydrogen separation membrane offgas that is a gas enriched in the components other than hydrogen; and a carbon dioxide separation membrane for separating the hydrogen separation membrane offgas into a carbon dioxide-enriched gas that is a gas enriched in carbon dioxide and a carbon dioxide separation membrane offgas that is a gas enriched in the components other than carbon dioxide.

(B7) The apparatus according to (B6), including a carbon dioxide liquefier for obtaining liquefied carbon dioxide by liquefying the carbon dioxide-enriched gas.

(B8) The apparatus according to (B6) or (B7), including a recycle line for recycling the second hydrogen-enriched gas to the inlet of the hydrogen-containing gas producing apparatus or to the inlet of the PSA apparatus.

(B9) The apparatus according to any one of (B6) to (B8), wherein the ratio α of the carbon dioxide permeability coefficient to the hydrogen permeability coefficient of the carbon dioxide separation membrane is 5 or more.

(B10) The apparatus according to any one of (B6) to (B9), wherein the ratio α of the carbon dioxide permeability coefficient to the hydrogen permeability coefficient of the carbon dioxide separation membrane is 100 or less.

Additionally, the methods and the apparatuses according to yet another aspect (aspect C) of the present invention are provided.

(C1) A method for producing hydrogen and recovering carbon dioxide which method produces hydrogen from a carbon-containing fuel and recovers carbon dioxide, the method including:

a hydrogen-containing gas producing step of obtaining a hydrogen-containing gas that contains hydrogen and carbon dioxide by reforming a carbon-containing fuel;

an adsorption step of adsorbing, by using a pressure swing adsorption apparatus provided with an adsorption tower containing an adsorbent, the components other than hydrogen, contained in the hydrogen-containing gas, on the adsorbent to yield a hydrogen-enriched gas that is enriched in hydrogen;

a high-pressure desorption step of desorbing the components adsorbed on the adsorbent under a relatively high pressure;

a low-pressure desorption step of desorbing the components adsorbed on the adsorbent under a relatively low pressure; and a carbon dioxide membrane-separating step of separating the gas obtained in the low-pressure desorption step with the use of a carbon dioxide separation membrane into a carbon dioxide-enriched gas that is a gas enriched in carbon dioxide and a carbon dioxide separation membrane offgas that is a gas enriched in the components other than carbon dioxide.

(C2) The method according to (C1), including a cleaning step of cleaning the interior of the adsorption tower having completed the low-pressure desorption step by using the hydrogen-enriched gas obtained from the adsorption step.

(C3) The method according to (C1) or (C2), including a mixing step of mixing together the gas obtained from the high-pressure desorption step and the gas obtained from the cleaning step to yield a mixed gas.

(C4) The method according to (C1) or (C2), wherein combustion heat, generated by combusting the gas obtained from the high-pressure desorption step, is utilized for the reforming in the hydrogen-containing gas producing step.

(C5) The method according to (C2), wherein combustion heat, generated by combusting the gas obtained from the cleaning step, is utilized for the reforming in the hydrogen-containing gas producing step.

(C6) The method according to (C3), wherein combustion heat, generated by combusting the mixed gas, is utilized for the reforming in the hydrogen-containing gas producing step.

(C7) The method according to (C1) or (C2), including a recycling step of recycling the gas obtained from the high-pressure desorption step to the adsorption step.

(C8) The method according to (C7), wherein in the recycling step, the gas obtained from the high-pressure desorption step is increased in the hydrogen concentration with the use of a hydrogen separation membrane, and thereafter recycled to the adsorption step.

(C9) The method according to any one of (C1) to (C8), wherein the ratio α of the carbon dioxide permeability coefficient to the hydrogen permeability coefficient of the carbon dioxide separation membrane is 5 or more.

Advantages of the Invention

According to the present invention, provided are a method and an apparatus which are capable of suppressing the increase of the system cost and are more efficient when the production of hydrogen and the recovery of carbon dioxide are simultaneously performed by using as a raw material a carbon-containing fuel.

BEST MODE FOR CARRYING OUT THE INVENTION

Figure 1:
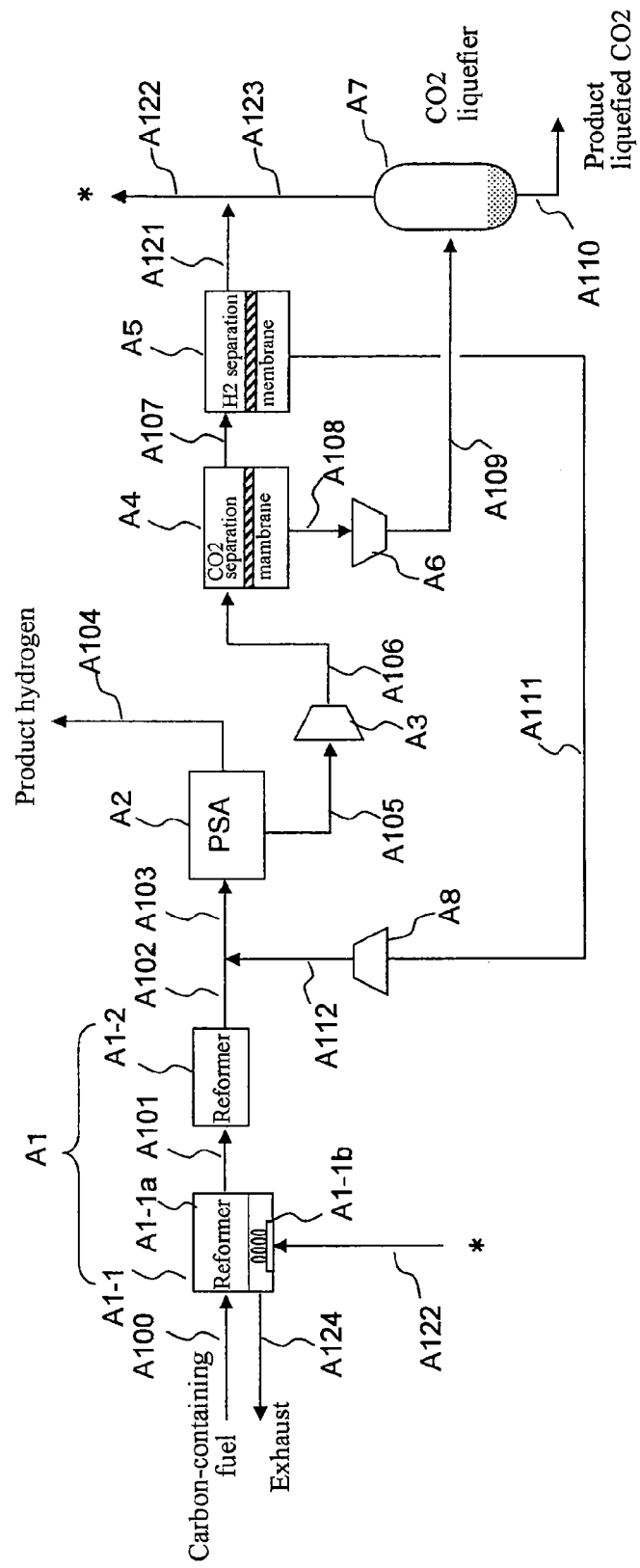
FIG. 1 is a flow diagram for illustrating an outline of an example of an apparatus capable of embodying an aspect A of the present invention.

In the present specification, unless otherwise specified, pressures are absolute pressures and percentages related to the gas compositions mean mole percentages calculated with excluding steam.

Additionally, a "first hydrogen-enriched gas" means a hydrogen-enriched gas obtained from a PSA apparatus, and a "second hydrogen-enriched gas" means a hydrogen-enriched gas obtained from the other apparatus, in particular, a hydrogen separation membrane.

[Carbon-Containing Fuel]

In the present invention, as the raw material for producing hydrogen, a carbon-containing fuel which is a fuel that contains carbon is used. As the carbon-containing fuel, a substance can be used by selecting, as appropriate, from substances which contain carbon and are capable of producing a hydrogen-containing gas through reforming.

Examples of the carbon-containing fuel may include fossil fuels. The fossil fuels mean fuels that can be produced by using as raw materials fossil resources such as petroleum, coal and natural gas, and can be in any form of gas, liquid or solid. Specific examples of the fossil fuels may include hydrocarbons such as methane, ethane, propane, natural gas, liquefied petroleum gas, naphtha, gasoline, kerosene, light oil and heavy oil; particularly preferably used are natural gas, liquefied petroleum gas, naphtha and kerosene. Further, as the carbon-containing fuel, oxygen-containing compounds that are capable of being produced from fossil fuels and contain oxygen in the molecules thereof, such as methanol, dimethyl ether and ethanol, are also preferably usable. Alternatively, those carbon-containing fuels which are produced not necessarily from fossil resources, such as ethanol obtained from bioresource, are also usable irrespective as to whether the carbon-containing fuels are hydrocarbons or oxygen-containing compounds.

[Hydrogen-Containing Gas Producing Step]

In the hydrogen-containing gas producing step, the reforming reaction of the carbon-containing fuel is conducted to produce the hydrogen-containing gas that contains at least hydrogen and carbon dioxide.

As the method for the reforming reaction, a heretofore known reforming method such as a steam reforming method, an autothermal reforming method or a partial oxidation method may be adopted; a method which excludes the mixing of the nitrogen in the air is preferable because such a method facilitates the step of purifying at a subsequent stage. Accordingly, the steam reforming method, or the autothermal reforming method or the partial oxidation method using pure oxygen as an oxidant is preferably adopted, and the steam reforming method may be particularly preferably adopted.

First, description is made on the case where a hydrocarbon such as natural gas, liquefied petroleum gas, naphtha or kerosene is used as the carbon-containing fuel. In this case, in the steam reforming method, the hydrocarbon and water are reacted with each other at a temperature of preferably 300° C. to 1000° C. and more preferably 400° C. to 900° C., and at a pressure of preferably atmospheric pressure to 10 MPa, more preferably 0.1 MPa to 10 MPa, furthermore preferably 0.2 MPa to 3 MPa and particularly preferably 0.2 MPa to 2 MPa, and are decomposed into a reformed gas that contains hydrogen, carbon monoxide, carbon dioxide and methane. The amount of the steam used is set in such a way that the S/C (the ratio of the number of moles of the steam to the number of moles of the carbon atoms in the carbon-containing fuel) is in a range preferably from 2 to 10 and more preferably 2.5 to 7. In this case, it is preferred that the reforming reaction is performed at a pressure exceeding the pressure required for driving the subsequent PSA, because it is not necessary to again boost the pressure of the reformed gas. The composition of the thus obtained reformed gas depends on the temperature, the pressure and the like, and is usually composed of approximately 65 to 75% hydrogen, 5 to 20% carbon monoxide, 5 to 20% carbon dioxide and 0.5 to 10% methane; it is preferable to select the conditions in such a way that the amounts of the remaining hydrocarbons having carbon-carbon bonds are as small as possible.

In the steam reforming reaction, usually a catalyst is used. As the catalyst, a heretofore known steam reforming catalyst is usable. Examples of the catalyst may include the metals of Group 8, 9 and 10 in the periodic table such as nickel, ruthenium, rhodium and platinum; in the selection of such a metal, a metal may be appropriately determined by a comprehensive consideration of the raw materials, the reaction conditions and others. For the autothermal reforming method and the partial oxidation method, a catalyst appropriately selected from heretofore known catalysts usable for these reforming methods may be adopted.

A hydrogen producing apparatus used in the hydrogen producing step has a reformer to conduct the reforming reaction. Additionally, for the purpose of further improving the hydrogen yield, it is possible to use a hydrogen producing apparatus in which a shift reactor is disposed at a stage subsequent to the reformer. In the shift reactor, the CO in the reformed gas obtained in the reformer and steam are reacted with each other to be converted into $CO_2$ and hydrogen. Where necessary, a steam injection inlet may be provided at a precedent stage to the shift reactor to add steam. As the catalyst used in the shift reactor, a heretofore known shift reaction catalyst such as a catalyst based on iron-chromium, copper-zinc or a noble metal such as platinum are usable. The reaction temperature of the shift reactor is appropriately set usually within a range from 200° C. to 500° C. There is no limitation to the reaction pressure; however, it is convenient and advantageous to conduct the shift reaction under a pressure in the vicinity of the pressure applied in the reforming reaction.

On the other hand, also when the oxygen-containing compound such as methanol, dimethyl ether or ethanol is used as the carbon-containing fuel, the same method as described above is applicable. In particular, when methanol or dimethyl ether is used, by performing the reforming reaction, with the use of a copper-zinc catalyst or the like as the catalyst, at 400° C. or lower, preferably at 350° C. or lower where the equilibrium concentration of carbon monoxide is low, it is also possible to attain an excellent hydrogen yield even without any shift reactor. In this case, when the steam reforming method is applied, the amount of steam is set in the S/C range from preferably 1.5 to 4 and more preferably from 1.5 to 2.5.

From the hydrogen-containing gas producing step, for example, a gas containing 65 to 80% hydrogen, 0.2 to 6% carbon monoxide, 10 to 35% carbon dioxide and 0 to 10% methane can be obtained.

When sulfur content is contained in the carbon-containing fuel, the carbon-containing fuel may be fed to the reformer after the carbon-containing fuel has been desulfurized, for the purpose of preventing the catalyst poisoning due to the sulfur content.

<Aspect A>

Hereinafter, the aspect A that is one of the aspects of the present invention is described in more detail. The production of the hydrogen-containing gas is as described above for each of the aspects.

[PSA Step]

In the PSA step, the hydrogen-containing gas produced in the hydrogen-containing gas producing step is preferably subjected to a dewatering treatment, and thereafter introduced into the pressure swing adsorption apparatus, namely a PSA (pressure swing adsorption) apparatus to be separated into a hydrogen-enriched gas (a first hydrogen-enriched gas) and a gas enriched in the components other than hydrogen (PSA offgas).

A PSA method is one of the methods for selectively separating a specific gas from a mixed gas, and is a method in which a mixed gas is introduced under a high pressure into an adsorption tower packed with an absorbent, thus a specific component is adsorbed to the absorbent, and consequently the mixed gas is separated into an adsorbed gas component and an unadsorbed gas component; then, the pressure of the adsorption system is reduced to desorb the adsorbate (adsorbed component or adsorbed gas component) adsorbed on the adsorbent, where necessary by using a purge gas. Industrially, a PSA apparatus provided with two or more towers each packed with an adsorbent is used; specifically used is such a PSA apparatus in which a series of pressure-boosting, adsorbing, pressure-releasing and cleaning operations is repeated from tower to tower, and thus continuous separation and recovery is enabled as the whole apparatus.

As the adsorbent packed in the PSA towers, it is possible to use, as appropriate, a heretofore known filling, such as activated carbon or zeolite, capable of separating hydrogen and the components other than hydrogen by way of adsorption.

The operation pressure of the PSA is varied depending on the stage of the cycle; at the time of adsorption operated under the highest pressure, the operation pressure is preferably in a range from 0.5 MPa to 10 MPa and more preferably in a range from 1 MPa to 5 MPa.

In the PSA method, usually hydrogen corresponds to the above-described unadsorbed gas component, and is not adsorbed on the adsorbent to pass through the PSA tower. Accordingly, a hydrogen-enriched gas (the first hydrogen-enriched gas) having a pressure close to the inlet pressure of the PSA apparatus can be obtained. The first hydrogen-enriched gas is particularly obtained in the adsorption step with PSA. The first hydrogen-enriched gas may be a product hydrogen.

The hydrogen purity of the first hydrogen-enriched gas is preferably 99% or more, more preferably 99.9% or more and furthermore preferably 99.99% or more. Further, the product hydrogen is preferably hydrogen usable for fuel-cell vehicles, and in such a case, usually the hydrogen purity thereof is preferably 99.99% or more, and additionally, a dew point and other requirements with respect to impurities are sometimes required to be satisfied. Accordingly, where necessary, the first hydrogen-enriched gas may be further subjected to treatments such as removal of water. Moreover, the product hydrogen may be converted into high-pressure hydrogen or liquefied hydrogen which is a form suitable for filling in fuel-cell vehicles, or for transportation to and storage in hydrogen stations.

The PSA offgas is obtained in the desorption step of the components adsorbed in the adsorption towers, in other words, in the step of regenerating the adsorption towers. For the purpose of obtaining an offgas as high as possible in the $CO_2$ concentration, desorption operation may be performed under a reduced pressure (a pressure lower than atmospheric pressure) in the adsorption towers. The cleaning of the adsorption towers, before the desorption step, with a gas containing high-concentration carbon dioxide is also effective for the purpose of increasing the carbon dioxide concentration in the PSA offgas.

The PSA offgas is approximately composed of the gas obtained by removing, through desorption, hydrogen (the first hydrogen-enriched gas) from the gas introduced into the PSA apparatus and additionally the gases generated by the pressure-releasing and the cleaning. The pressure of the PSA offgas is lowered as compared to the pressure of the introduction of the hydrogen-containing gas into the PSA apparatus; the pressure of the PSA offgas is preferably 0.01 to 0.5 MPa and more preferably 0.1 to 0.2 MPa. The PSA offgas contains, for example, 20 to 60% hydrogen, 0.5 to 15% carbon monoxide, 30 to 70% carbon dioxide and 1 to 15% methane, and more preferably contains 25 to 40% hydrogen, 5 to 15% carbon monoxide, 45 to 65% carbon dioxide and 5 to 12% methane.

[Carbon Dioxide Membrane-Separating Step]

In the present aspect, the carbon dioxide contained in the PSA offgas is made recoverable in a form suitable for storage. Accordingly, in the carbon dioxide membrane-separating step, a membrane selectively permeating carbon dioxide is used to separate the PSA offgas into a gas enriched in carbon dioxide (carbon dioxide-enriched gas) and a carbon dioxide separation membrane offgas that has not permeated the membrane and is enriched in the components other than carbon dioxide.

As described above, the pressure of the PSA offgas has been lowered, and accordingly it is preferable to boost the pressure of the PSA offgas before the introduction of the PSA offgas into the carbon dioxide membrane-separating step. The pressure after the pressure boosting, namely, the pressure on the feed side of the carbon dioxide separation membrane is set in a range preferably from 0.2 to 2 MPa and more preferably from 0.2 to 1 MPa.

As the carbon dioxide separation membrane, a membrane appropriately selected from heretofore known membranes capable of selectively permeating $CO_2$ may be adopted. Examples of such a membrane may include: a polymer material membrane as described by Powel et al. in Journal of Membrane Science, 279, 1 to 49 (2006); a dendrimer membrane as described in "Heisei 15 (2003) Fiscal Year Projects of Measures for Fixation of Carbon Dioxide and Technology in its Effective Utilization, International Projects for Promoting Global Environmental Research, Accomplishment Reports on Key Technology Research and Development Programs of Molecular Gate Functionalized Membrane for CO2 Separation"; an amine group-containing membrane described in WO2006/050531; and inorganic material membranes including a zeolite membrane.

From the viewpoint of the separation efficiency of carbon dioxide, as for the carbon dioxide separation membrane, the ratio (permeability coefficient ratio) α of the carbon dioxide permeability coefficient to the hydrogen permeability coefficient of the membrane is preferably 5 or more, more preferably 10 or more and furthermore preferably 20 or more.

It is to be noted that the permeability coefficient ratio α between $CO_2$ and hydrogen is defined by the following formula.

$$\alpha = (\text{permeability coefficient of carbon dioxide})/(\text{permeability coefficient of hydrogen})$$

Here, the permeability coefficient of each of the components is defined by the following formula wherein, for each of the components, Q represents the gas permeation rate, p1 represents the feed side pressure (partial pressure), p2 represents the permeate side pressure (partial pressure), A represents the area of the membrane and L represents the thickness of the membrane.

$$Q=(\text{Permeability coefficient})/L \times (p1-p2)A$$

Even when any types of materials are used, the shape of the separation membrane is not particularly limited, and may be selected from any shapes such as a plate, a tube and a hollow fiber.

The permeate side pressure in the carbon dioxide membrane-separating step is set at a pressure lower than the feed side pressure, may be set at a pressure lower than atmospheric pressure, and is selected within a range preferably from 0 MPa to 0.5 MPa and more preferably from 0.001 to 0.2 MPa.

A temperature at which the membrane separation is carried out is set at a temperature appropriate to the membrane material used.

Thus, carbon dioxide can be recovered as the carbon dioxide-enriched gas. The recovered carbon dioxide-enriched gas may be stored as it is by being injected into underground or by other means; however, the recovered carbon dioxide-enriched gas is preferably treated in a $CO_2$ liquefying step to produce liquefied $CO_2$. Therefore, the $CO_2$ concentration of the carbon dioxide-enriched gas is preferably increased for the purpose of facilitating the smooth operations in the $CO_2$ liquefying step, and is preferably 70% or more, more preferably 80% or more and furthermore preferably 90% or more. When the $CO_2$ concentration is 70% or more, the energy required in the liquefying step can be made smaller and the rate of the recovered liquefied $CO_2$ can be increased.

The components, contained in the carbon dioxide-enriched gas, other than carbon dioxide are, for example, approximately 0.5 to 20% hydrogen, 0.01 to 5% carbon monoxide and 0.01 to 5% methane. Additionally, the carbon dioxide separation membrane offgas contains, for example, 40 to 80% hydrogen, 5 to 50% carbon dioxide, 0 to 20% carbon monoxide and 0 to 20% methane.

As the method for liquefying $CO_2$, a heretofore known method for liquefying $CO_2$ such as a method utilizing the Joule-Thomson effect or a method in which cooling is performed with external cold heat while compression is being conducted may be adopted as appropriate. As a carbon dioxide liquefier, an apparatus selected from heretofore known apparatuses capable of liquefying carbon dioxide by these heretofore known methods for liquefying $CO_2$ may be used as appropriate. The liquefied $CO_2$ thus obtained is transported to a storage site with an appropriate method such as land transportation, marine transportation or pipeline, and then may be insulated underground or undersea, or may be used as various raw materials for synthesis of chemical products and the like because the liquefied $CO_2$ has a high $CO_2$ concentration. Combustible gases such as hydrogen and methane are still contained in the offgas (unliquefied gas) obtained from the step of liquefying $CO_2$, and may be transferred to a burner of the reformer to be used as fuel.

[Hydrogen Membrane-Separating Step]

In the hydrogen membrane-separating step, a membrane which selectively permeates hydrogen is used to separate the carbon dioxide separation membrane offgas into a gas enriched in hydrogen (second hydrogen-enriched gas) and a gas that has not permeated the membrane and is enriched in the components other than hydrogen (hydrogen separation membrane offgas). The carbon dioxide separation membrane offgas is the gas that has not permeated the carbon dioxide separation membrane, and hence the pressure reduction in the carbon dioxide membrane-separating step is small. Accordingly, when the carbon dioxide separation membrane offgas is introduced into the hydrogen membrane-separating step, it is not necessary to again boost the pressure of the carbon dioxide separation membrane offgas. Consequently, it is possible to concentrate hydrogen without consuming extra energy. In other words, while energy loss is being suppressed, a further effective utilization of hydrogen can be attained, and the hydrogen yield can be improved. The feed side pressure in the hydrogen membrane-separating step can be set at approximately the same pressure as the feed side pressure in the carbon dioxide membrane-separating step.

As the hydrogen separation membrane used in the hydrogen membrane-separating step, a membrane selected from heretofore known membranes capable of selectively permeating hydrogen may be adopted as appropriate. Examples of the hydrogen separation membrane may include: membranes of metals such as palladium; membranes of polymers such as polyimide; and porous membranes such as membranes of porous silica, zeolite and porous carbon. From the viewpoints of the easiness in handling and cost, a polymer membrane is preferably used.

As for the hydrogen separation membrane, the permeability coefficient ratio α between $CO_2$ and hydrogen is preferably 0 to 0.5, more preferably 0 to 0.3 and furthermore preferably 0 to 0.15.

Even when any types of materials are used, the shape of the separation membrane is not particularly limited, and may be selected from any shapes such as a plate, a tube and a hollow fiber.

The permeate side pressure in the hydrogen membrane-separating step is set at a pressure lower than the feed side pressure, may be set at a pressure not more than atmospheric pressure, and is selected within a range preferably from 0 MPa to 0.5 MPa and more preferably from 0.001 to 0.1 MPa.

A temperature at which the membrane separation is carried out is set at a temperature appropriate to the membrane material used; for example, for a palladium membrane, a temperature from 250 to 500° C. is preferable, and for a polyimide membrane, a temperature from room temperature to about 150° C. is preferable.

The second hydrogen-enriched gas contains, for example, 50 to 97% hydrogen, 3 to 40% carbon dioxide, 0 to 10% carbon monoxide and 0 to 10% methane. On the other hand, the hydrogen separation membrane offgas contains, for example, 1 to 30% hydrogen, 30 to 60% carbon dioxide, 1 to 20% carbon monoxide and 1 to 20% methane.

The hydrogen separation membrane offgas may be fed to a burner of the reformer in the hydrogen producing step to be used as fuel.

On the other hand, the second hydrogen-enriched gas has a relatively high hydrogen concentration, and hence, for the purpose of recovering the second hydrogen-enriched gas, the second hydrogen-enriched gas may be boosted in pressure as appropriate, and then may be recycled to an upstream stage of the PSA step. For that purpose, a recycle line for recycling the second hydrogen-enriched gas (the gas from the permeate side outlet of the hydrogen separation membrane) to the inlet of the PSA apparatus may be used. In this way, the hydrogen yield can be improved. Alternatively, when the second hydrogen-enriched gas is recycled to an upstream stage of the hydrogen producing step, methane in the second hydrogen-enriched gas can be converted into hydrogen. For that purpose, a recycle line for recycling the second hydrogen-enriched gas to the inlet of the hydrogen producing apparatus, in particular, to the inlet of the reformer may be used.

According to the present aspect, it is not necessary to again boost the pressure when the second hydrogen-enriched gas is obtained. This is because the pressure boosted when $CO_2$ is separated with the above-described $CO_2$ separation membrane is effectively utilized. Consequently, relatively high-purity hydrogen can be obtained almost without consuming energy. Usage of the second hydrogen-enriched gas having such a relatively high hydrogen concentration is not limited to the recycling to the a hydrogen-containing gas producing step or the PSA step, but the second hydrogen-enriched gas can also be used as a hydrogen source as appropriately. For example, by using the second hydrogen-enriched gas as a hydrogen source in another plant, the second hydrogen-enriched gas may be effectively used. Examples of such a plant may include a plant for performing a hydrogenation reaction or a hydrogenation desulfurization reaction of unsaturated organic compounds such as olefin, ketone, aldehyde and a nitro group.

[Process]

Hereinafter, with reference to one of the accompanying drawings, the preferred process for implementing the present aspect is described, but the present invention is not limited thereto.

As shown in FIG. 1, a hydrogen producing apparatus A1 includes a reformer A1-1 and a shift reactor A1-2 connected downstream of the reformer. The reformer includes a reforming reaction tube A1-1a and a burner A1-1b for externally heating the reaction tube. A carbon-containing fuel is fed from a line A100 to the reformer, in particular, to the reforming reaction tube. Steam, oxygen and the like (not shown) necessary for the reforming reaction are also fed to the reformer as appropriate. When the carbon-containing fuel is liquid or solid, the carbon-containing fuel can be beforehand vaporized as appropriate. Where necessary, the carbon-containing fuel can be fed to the reformer after the carbon-containing fuel has been desulfurized with a desulfurizer (not shown).

The carbon-containing fuel is reformed in the interior of the reforming reaction tube, and the reformed gas is discharged from the reformer (line A101). In the shift reactor, CO and steam in the reformed gas are converted into $CO_2$ and hydrogen.

The hydrogen-containing gas (line A102) obtained from the hydrogen producing apparatus is fed to a PSA apparatus A2 through a line A103. Specifically, the hydrogen-containing gas is fed into a PSA tower which is conducting the adsorption step, the components other than hydrogen contained in the hydrogen-containing gas are adsorbed on the adsorbent, and the first hydrogen-enriched gas is taken out as a product hydrogen (line A104). On the other hand, from a PSA tower which is conducting the regenerating step, a PSA offgas is discharged (line A105), boosted in pressure by a pressure booster A3, and thereafter fed to the carbon dioxide separation membrane A4 (line A106).

The carbon dioxide-enriched gas (line A108) is obtained as the gas having permeated the carbon dioxide separation membrane, boosted in pressure by a pressure booster A6, and fed to the carbon dioxide liquefier A7 (line A109). The carbon dioxide separation membrane offgas (line A107) discharged without permeating the carbon dioxide separation membrane is fed to a hydrogen separation membrane A5. As a gas having permeated the hydrogen separation membrane, a second hydrogen-enriched gas is obtained, and is recycled to the PSA apparatus through a line A111, a pressure booster A8 and a line A112. The hydrogen separation membrane offgas (line A121) discharged without having permeated the hydrogen separation membrane is fed as fuel to the burner A1-1b of the reformer through a line A122.

The product liquefied carbon dioxide is recovered (line A110) from the carbon dioxide liquefier. An unliquefied gas (line A123) which is discharged from the carbon dioxide liquefier and the hydrogen separation membrane offgas merge together to be fed to the burner A1-1b from the line A122.

The combustible content in the gas fed from the line A122 is combusted in the burner A1-1b, and the combustion gas is discharged from a line A124. The heat of combustion obtained is utilized for heating the reforming reaction tube.

<Aspect B>

Hereinafter, an aspect B that is another aspect of the present invention is described in more detail.

[PSA Step]

The PSA step in the present aspect is the same as the PSA step described in the aspect A.

[Hydrogen Membrane-Separating Step]

In the present aspect, hydrogen contained in the PSA offgas is effectively utilized, and carbon dioxide is made recoverable in a form suitable for storage. By performing a hydrogen membrane-separating step before a carbon dioxide membrane-separating step, the $CO_2$ concentration in the gas fed to the carbon dioxide separation membrane can be beforehand increased. In this way, even when the $CO_2$ selectivity of the carbon dioxide separation membrane is not so high, the recovery of carbon dioxide can be performed efficiently.

Accordingly, in the hydrogen membrane-separating step, a membrane which selectively permeates hydrogen is used to separate the PSA offgas into a gas enriched in hydrogen (second hydrogen-enriched gas) and a gas that has not permeated the membrane and is enriched in the components other than hydrogen (hydrogen separation membrane offgas).

As described above, the pressure of the PSA offgas has been lowered, and accordingly it is preferable to boost the pressure of the PSA offgas before the introduction of the PSA offgas into the hydrogen membrane-separating step. The pressure after the pressure boosting, namely, the pressure on the feed side of the hydrogen separation membrane is set in a range preferably from 0.2 to 2 MPa and more preferably from 0.2 to 1 MPa. In this case, when the feed side pressure is 0.2 MPa or more, it is easy to attain a good efficiency in the membrane separation by increasing the differential pressure between the feed side pressure and the permeate side pressure. On the other hand, when the feed side pressure is 2 MPa or less, it is easy to suppress the differential pressure applied to the membrane and to thereby avoid the case where the permeation performance is sacrificed in order to increase the membrane strength beyond necessity.

As the hydrogen separation membrane, a membrane selected from heretofore known membranes capable of selectively permeating hydrogen may be adopted as appropriate. Examples of such a membrane are the same as the examples described for the aspect A.

Even when any types of materials are used, the shape of the separation membrane is not particularly limited, and may be selected from any shapes such as a plate, a tube and a hollow fiber.

As for the hydrogen separation membrane, the ratio (permeability coefficient ratio) $\alpha$ of the carbon dioxide permeability coefficient to the hydrogen permeability coefficient of the membrane is preferably 0 to 0.5, more preferably 0 to 0.3 and furthermore preferably 0 to 0.15.

Here, the permeability coefficient ratio $\alpha$ between $CO_2$ and hydrogen is defined as described above. On the other hand, as for the permeate side pressure, the permeate side hydrogen partial pressure is required to be lower than the feed side hydrogen partial pressure and the permeate side pressure may be set at a pressure lower than atmospheric pressure, and the specific value of the permeate side hydrogen partial pressure is selected within a range preferably from 0 to 0.5 MPa, more preferably from 0.0001 MPa to 0.2 MPa, and furthermore preferably 0.001 to 0.1 MPa.

In this case, where necessary, a purge gas may be used on the permeate side; steam, which is capable of being easily separated from a gas by cooling, is preferably used as a purge gas.

A temperature at which of the membrane separation is carried out is set at a temperature appropriate to the membrane material used; for example, for a palladium membrane, a temperature from 250 to 500° C. is preferable, and for a polyimide membrane, a temperature from room temperature to about 150° C. is preferable.

For example, when a polymer membrane such as a polyimide membrane is used, the second hydrogen-enriched gas thus obtained contains 50 to 99% hydrogen, 3 to 40% carbon dioxide, 0 to 10% carbon monoxide and 0 to 10% methane; 10 to 99% of the hydrogen contained in the PSA offgas can be recovered.

The second hydrogen-enriched gas obtained in the hydrogen membrane-separating step may be boosted in pressure as appropriate, and then recycled upstream of the PSA step. For that purpose, a recycle line for recycling the second hydrogen-enriched gas (the gas from the permeate side outlet of the hydrogen separation membrane) to the inlet of the PSA apparatus may be used. In this way, the hydrogen yield can be improved. When the second hydrogen-enriched gas is recycled to an upstream stage of the hydrogen producing step, the methane in the second hydrogen-enriched gas can be converted into hydrogen. For that purpose, a recycle line for recycling the second hydrogen-enriched gas to the inlet of the hydrogen producing apparatus, in particular, to the inlet of the reformer may be used. Alternatively, the second hydrogen-enriched gas may be directed to a combustion means such as a burner provided in the reformer to burn combustible content in the second hydrogen-enriched gas in the combustion means, and thereafter the second hydrogen-enriched gas may be discharged to outside.

On the other hand, the components of the hydrogen separation membrane offgas contain, for example, 1 to 30% hydrogen, 30 to 60% carbon dioxide, 1 to 20% carbon monoxide and 1 to 20% methane.

[Carbon Dioxide Membrane-Separating Step]

In a carbon dioxide membrane-separating step, a separation membrane having a $CO_2$ selectivity is used to separate the hydrogen separation membrane offgas into a gas enriched in $CO_2$ (carbon dioxide-enriched gas) and a gas that has not permeated the membrane and is enriched in the components other than $CO_2$ (carbon dioxide separation membrane offgas).

The hydrogen separation membrane offgas is the gas that has not permeated the hydrogen separation membrane, and hence the pressure reduction thereof in the hydrogen membrane-separating step is small. Accordingly, it is not necessary to again boost the pressure of the hydrogen separation membrane offgas when the hydrogen separation membrane offgas is introduced into the carbon dioxide membrane-separating step. Consequently, it is possible to concentrate $CO_2$ without consuming extra energy. Moreover, the $CO_2$ concentration of the hydrogen separation membrane offgas is high and the membrane separation load can be reduced in the carbon dioxide membrane-separating step, and hence no separation membrane having extremely high performance is needed as the $CO_2$ separation membrane. Consequently, there are advantages such as cost reduction. The feed side pressure in the carbon dioxide membrane-separating step may be set at approximately the same pressure as the feed side pressure in the hydrogen membrane-separating step.

As the carbon dioxide separation membrane used in the carbon dioxide membrane-separating step, a membrane selected from heretofore known membranes capable of selectively permeating $CO_2$ may be adopted as appropriate. Examples of such a membrane are the same as the examples described for the aspect A.

Even when any types of materials are used, the shape of the separation membrane is not particularly limited, and may be selected from any shapes such as a plate, a tube and a hollow fiber.

From the viewpoint of the separation efficiency of carbon dioxide, the permeability coefficient ratio α between $CO_2$ and hydrogen of the carbon dioxide separation membrane is preferably 5 or more, more preferably 10 or more and furthermore preferably 20 or more. On the other hand, as described above, according to the present aspect, $CO_2$ separation can be performed well without using any extremely high performance carbon dioxide separation membrane, and hence even a membrane of 100 or less, and moreover, even a membrane of 50 or less in the value of the permeability coefficient ratio α of the carbon dioxide separation membrane can be preferably used.

The permeate side pressure in the membrane separation in the carbon dioxide membrane-separating step is set at a pressure lower than the feed side pressure, may be set at a pressure lower than atmospheric pressure, and is selected within a range preferably from 0 MPa to 0.5 MPa and more preferably from 0.001 to 0.2 MPa.

A temperature at which the membrane separation is carried out is set at a temperature appropriate to the membrane material used.

Thus, carbon dioxide can be recovered as the carbon dioxide-enriched gas. The recovered carbon dioxide-enriched gas may be stored as it is by being injected into underground or by other means; however the recovered carbon dioxide-enriched gas is preferably treated in a $CO_2$ liquefying step to produce liquefied $CO_2$. Therefore, the $CO_2$ concentration of the carbon dioxide-enriched gas is preferably increased for the purpose of facilitating the smooth operations in the step of liquefying $CO_2$, and is preferably 70% or more, more preferably 80% or more and furthermore preferably 90% or more. When the $CO_2$ concentration is 70% or more, the energy required in the liquefying step can be made smaller and the rate of the recovered liquefied $CO_2$ can be increased.

The components, contained in the carbon dioxide-enriched gas, other than carbon dioxide are for example, approximately 0.5 to 20% hydrogen, 0.01 to 5% carbon monoxide and 0.01 to 5% methane.

The method for liquefying $CO_2$ and the carbon dioxide liquefier, and additionally the utilization of the obtained liquefied $CO_2$ and the utilization of an offgas obtained from the $CO_2$ liquefying step are the same as described for the aspect A.

[Process]

Hereinafter, with reference to one of the accompanying drawings, the preferred process for implementing the present aspect is described, but the present invention is not limited thereto.

Figure 2:
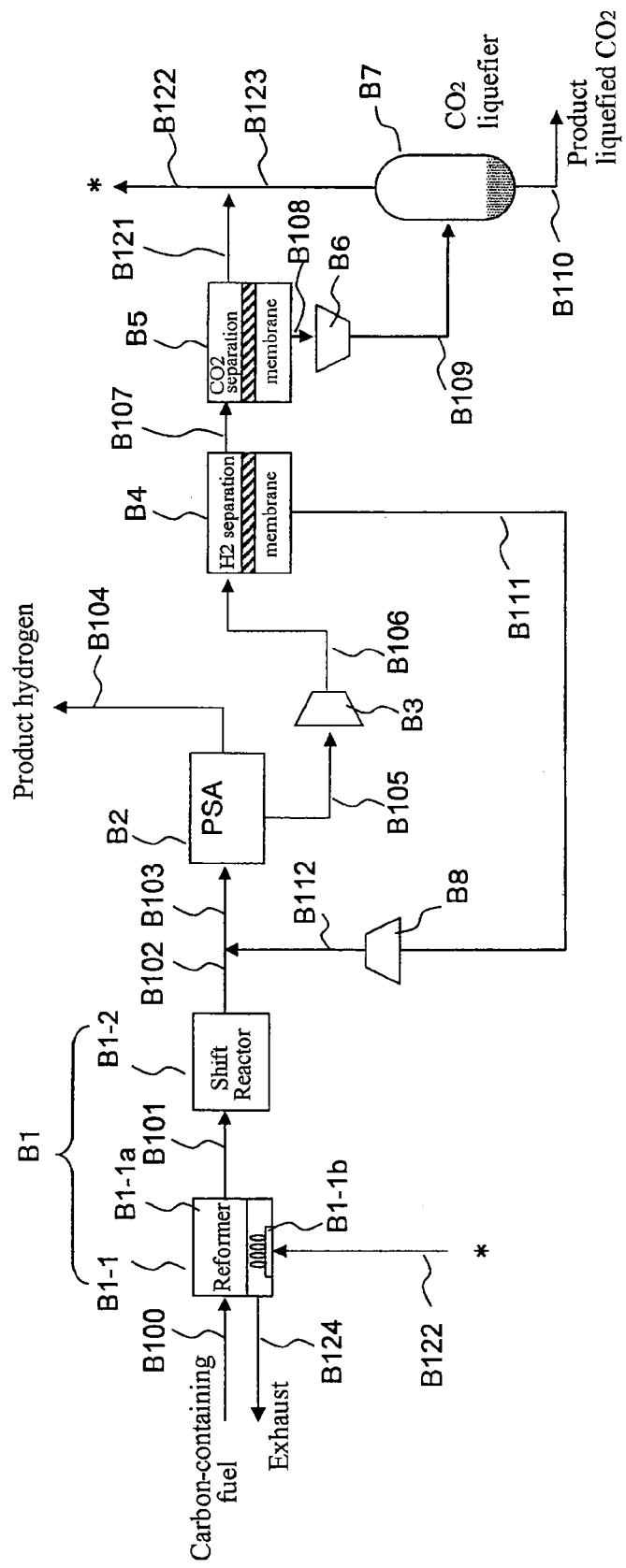
FIG. 2 is a flow diagram for illustrating an outline of an example of an apparatus capable of embodying an aspect B of the present invention.

As shown in FIG. 2, a hydrogen producing apparatus B1 includes a reformer B1-1 and a shift reactor B1-2 connected downstream of the reformer. The reformer includes a reforming reaction tube B1-1a and a burner B1-1b for externally heating the reaction tube. A carbon-containing fuel is fed from a line B100 to the reformer, in particular, to the reforming reaction tube. Steam, oxygen and the like necessary for the reforming reaction are also fed to the reformer as appropriate (not shown). When the carbon-containing fuel is liquid or solid, the carbon-containing fuel may be beforehand vaporized as appropriate. Where necessary, the carbon-containing fuel may be fed to the reformer after the carbon-containing fuel has been desulfurized with a desulfurizer (not shown).

The carbon-containing fuel is reformed in the interior of the reforming reaction tube, and reformed gas is discharged from the reformer (line B101). In the shift reactor, CO and steam in the reformed gas are converted into $CO_2$ and hydrogen.

The hydrogen-containing gas (line B102) obtained from the hydrogen producing apparatus is fed to a PSA apparatus B2 through a line B103. Specifically, the hydrogen-containing gas is fed into a PSA tower which is conducting the adsorption step, the components other than hydrogen contained in the hydrogen-containing gas are adsorbed on an adsorbent, and a first hydrogen-enriched gas is taken out as a product hydrogen (line B104). On the other hand, from a PSA tower undergoing the regenerating step, a PSA offgas is discharged (line B105), boosted in pressure by a pressure booster B3, and thereafter fed to the hydrogen separation membrane B4 (line B106).

As the gas having permeated the hydrogen separation membrane, a second hydrogen-enriched gas is obtained, and is recycled to the PSA apparatus through a line B111, a pressure booster B8 and a line B112. A hydrogen separation membrane offgas (line B107) discharged without having permeated the hydrogen separation membrane is fed to the carbon dioxide separation membrane B5.

A carbon dioxide-enriched gas (line B108) is obtained as a gas having permeated the carbon dioxide separation membrane, boosted in pressure by a pressure booster B6, and fed to a carbon dioxide liquefier B7 (line B109). The carbon dioxide separation membrane offgas (line B121) discharged without permeating the carbon dioxide separation membrane is fed as fuel to the burner B1-1*b* of the reformer through a line B122.

The product liquefied carbon dioxide is recovered (line B110) from the carbon dioxide liquefier. An unliquefied gas (line B123) which is discharged from the carbon dioxide liquefier and the carbon dioxide separation membrane offgas merge together to be fed to the burner B1-1*b* from the line B122.

The combustible content in the gas fed from the line B122 is combusted in the burner B1-1*b*, and the combustion gas is discharged from a line B124. The heat of combustion obtained is utilized for heating the reforming reaction tube.
<Aspect C>

Hereinafter, an aspect C that is yet another aspect of the present invention is described in more detail.
[Treatment by PSA Apparatus]

In an adsorption step, the hydrogen-containing gas produced in the hydrogen-containing gas producing step is preferably subjected to a dewatering treatment, and thereafter introduced into a pressure swing adsorption apparatus, namely a PSA (pressure swing adsorption) apparatus, and the components other than hydrogen are adsorbed on an adsorbent provided in the PSA apparatus to yield a hydrogen-enriched gas that is enriched in hydrogen. When the adsorbent is regenerated, a high-pressure desorption step wherein the components adsorbed on the adsorbent are desorbed under a relatively high pressure and a low-pressure desorption step wherein the components adsorbed on the adsorbent are desorbed under a relatively low pressure are performed (the pressure in the low-pressure desorption step is lower than the pressure in the high-pressure desorption step). A gas (high-pressure desorption offgas) obtained from the high-pressure desorption step and a gas (low-pressure desorption offgas) obtained from the low-pressure desorption step are different in composition from each other.

As described above, in the present aspect, the desorption step is conducted as divided, depending on the pressure, into two steps of the high-pressure desorption step and the low-pressure desorption step. However, the desorption step may be conducted as divided into three or more steps, the high-pressure desorption step may be conducted as further divided, depending on pressure, into two or more steps, and the low-pressure desorption step may be conducted as further divided, depending on pressure, into two or more steps.

In the PSA method, usually hydrogen corresponds to the above-described unadsorbed gas component, and is not adsorbed on the adsorbent to pass through the PSA tower. Accordingly, a hydrogen-enriched gas having a pressure close to the inlet pressure of the PSA apparatus can be obtained. The hydrogen-enriched gas obtained in the adsorption step may be a product hydrogen.

On the other hand, regeneration of the adsorption tower can be performed by a regenerating step including a desorption step (the adsorption tower is pressure-released, the adsorbed component is desorbed from the adsorbent. At this time, no gas feeding is made to the adsorption tower), a cleaning step and a pressure-boosting step, and herewith the adsorption tower is recovered to the condition capable of conducting the above-described adsorption step again. A PSA offgas obtained in the regenerating step contains carbon dioxide, methane, carbon monoxide and the like which are the components adsorbed in the PSA adsorption tower. In the present aspect, the PSA offgas is recovered as divided into two or more portions.

An example of a sequence in the PSA operation is presented.

1) A hydrogen-containing gas after having been dewatered is passed through a regenerated adsorbent, the components other than hydrogen are removed by being adsorbed on the absorbent, and thus high-purity hydrogen (hydrogen-enriched gas) is obtained by passing through an adsorption tower (adsorption step).

2) The gas pressure in the adsorption tower is released to yield an offgas A (high-pressure desorption step).

3) The interior of the adsorption tower is made under a reduced pressure (a pressure lower than atmospheric pressure) to yield an offgas B (low-pressure desorption step).

4) The interior of the adsorption tower is cleaned with high-purity hydrogen to yield an offgas C (cleaning step). The gas in the adsorption tower is replaced with the high-purity hydrogen. At this time, it is permissible if the remaining adsorbed component is desorbed.

5) High-purity hydrogen is introduced into the adsorption tower to boost the pressure (pressure-boosting step).

As the high-purity hydrogen to be used in the cleaning step and the pressure-boosting step, the hydrogen-enriched gas obtained from the adsorption step may be used.

The carbon dioxide concentrations of the offgases obtained in the above-described sequence are generally such that the offgas B is high and the offgases A and C are low in the carbon dioxide concentration. Which of the offgases A and C is higher in the carbon dioxide concentration is varied depending on the operation conditions. Some additional operations may be added to the above-described sequence; the respective additional operations may produce different offgases. In the present aspect, it is possible to treat all of these offgases as combined into one offgas (in an example presented below, the offgases A and C are combined into one hydrogen-rich offgas), which is preferable from the viewpoint of simplifying the system.

Figure 3:
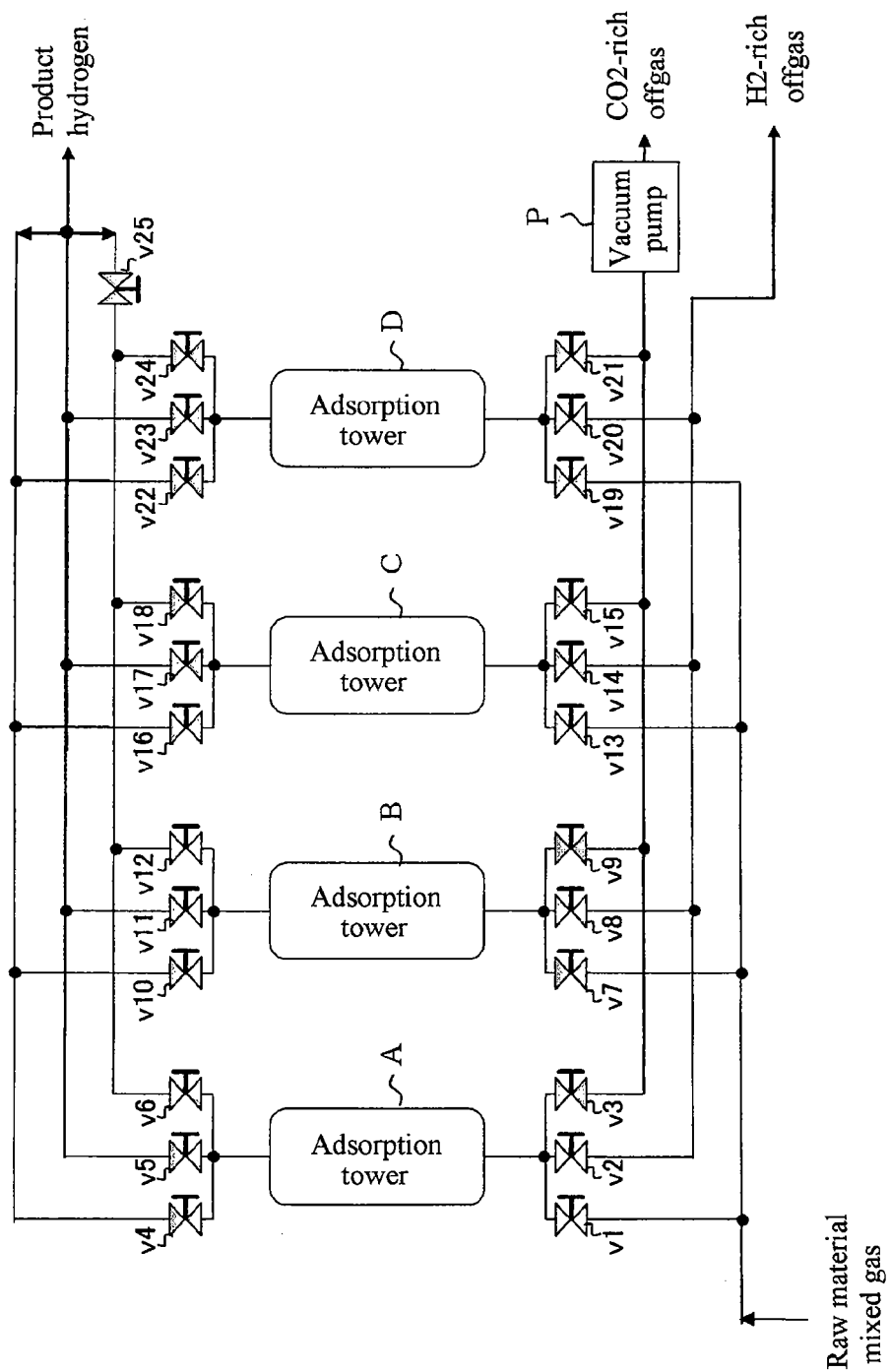
FIG. 3 is a schematic diagram illustrating an example of a PSA apparatus usable in the present invention.

With reference to FIG. 3, an example of the PSA sequence is described in more detail. FIG. 3 is a schematic diagram illustrating an example of the configuration of a PSA apparatus. Here, description is made on a method for regenerating adsorption towers while the PSA offgas is being collected as divided into two offgases, namely, a hydrogen-rich offgas relatively high in hydrogen concentration (the above-described offgases A and C or a mixture thereof corresponds to this offgas) and a $CO_2$-rich offgas relatively high in carbon dioxide concentration (the above-described offgas B corresponds to this offgas). In FIG. 3, v1 to v24 represent stop valves and v25 represents a pressure reducing valve.

First, an adsorption step is conducted in which v1 and v5 are opened, and a high pressure hydrogen-containing gas as a raw material is introduced into an adsorption tower A which has undergone the regeneration treatment to yield high-purity hydrogen.

At the stage in which the adsorption tower A approaches the saturation by impurities in the raw material hydrogen-containing gas, v1 and v5 are closed, and on the other hand, v7 and v11 are opened and the production of the high-purity hydrogen is continued by using an adsorption tower B. Successively, the adsorption tower A is subjected to a regeneration operation; first, a pressure-releasing operation i, in which v2 is opened to pressure-release the interior of the adsorption tower A and to obtain a first hydrogen-rich offgas, is performed (high-pressure desorption step). The pressure at the time of completion of the pressure-releasing operation i is set at a pressure lower than the pressure in the adsorption step, and is in a range preferably from atmospheric pressure to 0.5 MPa and more preferably from atmospheric pressure to 0.2 MPa; when this pressure is equal to or larger than atmospheric pressure, it is possible to suppress a situation in which a larger amount of components other than hydrogen is contained in the first hydrogen-rich offgas; on the other hand, when this pressure is 0.5 MPa or less, it is possible to suppress a situation in which a larger amount of hydrogen remains in the adsorption tower so as to suppress the incorporation of a larger amount of hydrogen into a $CO_2$-rich offgas to be subsequently obtained.

A pressure-releasing operation ii (low-pressure desorption step) is conducted, wherein after the pressure-releasing operation i (high-pressure desorption step), v2 is closed and v3 is opened, and desorption is further conducted under a reduced pressure to yield a $CO_2$-rich offgas that contains the components other than hydrogen in larger amounts. The desorption conducted under a reduced pressure enables to promote the desorption of the gas. For that purpose, a vacuum pump P can be used. For the purpose of performing the desorption more completely, it is preferable to conduct in this step the desorption until the desorption of the gas components from the adsorption tower no longer occurs; however, the end point is determined by taking into consideration the factors such as the time required for the step. The pressure at the end point of the pressure-releasing operation ii, in the case where a vacuum pump is used, is in a range preferably from 0.0001 MPa to 0.05 MPa and more preferably from 0.001 MPa to 0.02 MPa.

A cleaning step is conducted, wherein after completion of the desorption operation ii (low-pressure desorption step), v3 is closed and v6 is opened and successively v2 is opened, and the cleaning of the interior of the tower is conducted with the high-purity hydrogen having passed through the pressure reducing valve v25 and at the same time a second hydrogen-rich offgas is obtained. The pressure at this time is preferably from atmospheric pressure to 0.5 MPa and more preferably from atmospheric pressure to 0.3 MPa. The first and second hydrogen-rich offgases may be taken out as a single gas stream, without being discriminated from each other, and may be fed to an appropriate treatment device such as a hydrogen separation membrane or a burner. Further, for example, by mixing together a portion of the first hydrogen-rich offgas and the second hydrogen-rich offgas, this mixed gas and a gas composed of the rest of the first hydrogen-rich offgas can be produced. Alternatively, after the total amount of the first hydrogen-rich offgas and the total amount of the second hydrogen-rich offgas are mixed together, the mixed gas thus obtained may be divided into two portions. As in these cases, where necessary, the first and second hydrogen-rich offgases may be mixed and divided as appropriate, and thus may be handled as two or more gas streams.

A pressure-boosting step is conducted, wherein after completion of the cleaning step, v6 and v2 are closed and v4 is opened, and the interior of the tower is filled with high-pressure and high-purity hydrogen.

A continuous production of high-purity hydrogen, the hydrogen-rich offgas and the $CO_2$-rich offgas comes to be possible by repeating a series of operations wherein these four steps, namely, the adsorption step, the desorption step (the high-pressure desorption step and the low-pressure desorption step), the cleaning step and the pressure-boosting step are repeated in each of the adsorption towers A to D, with time shifts between these towers. The compositions of these gases depend on the PSA operation conditions and the composition of the raw material gas; the composition of the hydrogen-rich offgas is, for example, such that hydrogen: 50 to 98%, carbon monoxide: 0 to 10%, carbon dioxide: 2 to 30%, methane: 0 to 10%; the composition of the $CO_2$-rich offgas is, for example, such that hydrogen: 2 to 15%, carbon monoxide: 1 to 30%, carbon dioxide: 40 to 95%, methane: 1 to 30%. A flow rate ratio (in terms of moles) between the hydrogen-rich offgas and the $CO_2$-rich offgas is preferably 1:5 to 5:1 and more preferably 1:3 to 3:1.

[Carbon Dioxide Membrane-Separating Step]

In the present aspect, a low-pressure desorption gas obtained from the low-pressure desorption step is separated, with the use of a carbon dioxide separation membrane, into a carbon dioxide-enriched gas in which the carbon dioxide concentration is further increased and a carbon dioxide separation membrane offgas in which the components other than carbon dioxide are enriched. Preferably, the offgas obtained in performing the desorption operation by reducing the pressure of the adsorption tower is introduced into the carbon dioxide membrane-separating step. The offgas B referred to in the above-described sequence example corresponds to this offgas.

In the carbon dioxide membrane-separating step, carbon dioxide is concentrated with the use of a carbon dioxide separation membrane. As the carbon dioxide separation membrane, a membrane selected from heretofore known membranes capable of selectively permeating $CO_2$ may be adopted as appropriate. Examples of such a membrane are the same as the examples described for the aspect A.

From the viewpoint of the separation efficiency of carbon dioxide, as for the carbon dioxide separation membrane, the ratio (permeability coefficient ratio) $\alpha$ of the carbon dioxide permeability coefficient to the hydrogen permeability coefficient of the membrane is preferably 5 or more, more preferably 10 or more and furthermore preferably 20 or more. When $\alpha$ is 5 or more, it is possible to suppress the decrease of the $CO_2$ concentration in the carbon dioxide separation membrane permeate gas, and it is possible to suppress a situation in which the energy required for compression comes to be large and at the same time the liquefaction yield is decreased when a carbon dioxide liquefying step is applied at a later stage.

Here, the permeability coefficient ratio α is defined as described above.

Even when any types of materials are used, the shape of the separation membrane is not particularly limited, and may be selected from any shapes such as a plate, a tube and a hollow fiber.

The feed side pressure and the permeate side pressure in the carbon dioxide membrane-separating step are determined according to the gas composition, the flow rate, the shape of the apparatus and the like as appropriate; the feed side pressure is in a range preferably from 0.2 to 10 MPa, more preferably from 0.3 to 5 MPa and furthermore preferably from 0.5 to 2 MPa. When the pressure is 0.2 MPa or more, it is easy to obtain a good permeation rate and to suppress the increase of the membrane area. On the other hand, when the pressure is 10 MPa or less, the increase of the separation membrane strength for the purpose of withstanding the pressure applied to the separation membrane can be suppressed, and consequently a good permeation performance can be easily attained. On the other hand, although the permeate side pressure is preferably as small as possible from the viewpoint of the permeation performance, the permeate side pressure is determined by a comprehensive consideration of the power required for creating a reduced pressure (a pressure lower than atmospheric pressure), the pressure resistance of the membrane and other factors, and is in a range preferably from 0.0001 to 0.5 MPa and more preferably from 0.001 to atmospheric pressure.

A temperature at which the membrane separation is carried out is set at a temperature appropriate to the membrane material used.

Carbon dioxide can be recovered as the carbon dioxide-enriched gas. The carbon dioxide-enriched gas may be stored as it is by being injected into underground; or, by introducing the carbon dioxide-enriched gas into a $CO_2$ liquefying step, liquefied carbon dioxide may be produced. In the case where the liquefaction is conducted, the $CO_2$ concentration of the carbon dioxide-enriched gas is preferably increased for the purpose of facilitating the smooth operations in the $CO_2$ liquefying step, and is preferably 70% or more, more preferably 80% or more and furthermore preferably 90% or more. When the $CO_2$ concentration is 70% or more, the energy required in the liquefying step can be made smaller and the rate of the recovered liquefied $CO_2$ can be increased.

The method for liquefying $CO_2$ and the carbon dioxide liquefier, and additionally the utilization of the liquefied $CO_2$ obtained and the offgas obtained in the $CO_2$ liquefying step are the same as described for the aspect A.

On the other hand, the carbon dioxide separation membrane offgas may be transferred to a burner of the reformer to be combusted, and thus the thermal energy contained in the offgas may be effectively utilized; when the contents of methane, carbon monoxide and others in the offgas are large, the offgas may be introduced into the inlet of the reformer and may be reused as a reforming raw material.

[Cleaning of PSA Tower with Carbon Dioxide]

Before starting the low-pressure desorption step after the high-pressure desorption step has been completed (before starting the pressure-reduction operation in the above-described sequence example), the interior of the tower may be cleaned with relatively high-purity carbon dioxide having a carbon dioxide concentration of preferably 70% or more, more preferably 80% or more and furthermore preferably 90% or more. As the carbon dioxide used herein, the recovered carbon dioxide may be used. Along with this operation, a new offgas (offgas D) is generated. This cleaning operation with carbon dioxide has an effect to increase the carbon dioxide concentration in the low-pressure desorption gas (the offgas B in the above-described sequence example).

The offgas D has a relatively high $CO_2$ concentration, and hence may be used as a portion of the $CO_2$-rich offgas and may be used for a fuel for use in a burner as combustion gas.

[Utilization of a Gas not Introduced into the Carbon Dioxide Separation Membrane]

Among the PSA offgases obtained in the process of regenerating PSA, a gas that is not introduced into the carbon dioxide separation membrane may be used as a fuel for a burner provided in the reformer or the like. In particular, at least one of the gas obtained from the high-pressure desorption step (the offgas A in the above-described sequence example) and the gas obtained from the cleaning step (the offgas C in the above-described sequence example) is used as the fuel for the burner provided in the reformer (as the at least one gas, a mixed gas obtained by mixing these gases may also be applicable), and thus may be utilized for the reforming in the hydrogen-containing gas producing step. The steam reforming reaction is a reaction with a large endotherm, and accordingly, the heat required for the steam reforming reaction can be supplied by utilizing the heat of combustion in the burner.

Alternatively, for the purpose of recovering hydrogen from the gas, among the PSA offgases obtained in the process of regenerating PSA, which is not introduced, into the carbon dioxide separation membrane, at least a portion of the gas that is not introduced into the carbon dioxide separation membrane may be recycled to the PSA apparatus to be used in the adsorption step. In particular, at least one of the high-pressure desorption gas obtained from the high-pressure desorption step (the offgas A in the above-described sequence example) and the gas obtained from the cleaning step (the offgas C in the above-described sequence example) may be recycled to the adsorption step (as the at least one gas, a mixed gas obtained by mixing these gases may also be applicable). Upon recycling, the gas concerned may be boosted in pressure as appropriate.

Moreover, the gas to be recycled may be recycled to the adsorption step after the hydrogen concentration of the gas is increased with the use of a hydrogen separation membrane. In particular, the hydrogen-rich gas such as the high-pressure desorption gas is separated with the use of a hydrogen separation membrane into the gas enriched in hydrogen (second hydrogen-enriched gas) and the gas enriched in the components other than hydrogen (hydrogen separation membrane offgas), and then the second hydrogen-enriched gas may be recycled to the adsorption step.

According to the above-described sequence example, the offgas A, the offgas C or a combination of the offgas A and the offgas C may be increased in hydrogen concentration, preferably with the use of the below-described hydrogen separation membrane or the like, and then may be recycled to the adsorption step.

The carbon dioxide concentration of the gas to be recycled to the adsorption step is preferably 30% or less, more preferably 20% or less and furthermore preferably 10% or less, and on the other hand, the hydrogen concentration of the gas concerned is preferably 70% or more, more preferably 80% or more and furthermore preferably 90% or more.

In the present aspect, as described above, a hydrogen membrane-separating step may be included where necessary. As the hydrogen separation membrane usable in this case, a membrane selected from heretofore known membranes capable of selectively permeating hydrogen may be adopted as appropriate. Examples of such a membrane are the same as the examples described for the aspect A.

Even when any types of materials are used, the shape of the separation membrane is not particularly limited, and may be selected from any shapes such as a plate, a tube and a hollow fiber.

The feed side pressure in the hydrogen membrane-separating step is in a range from 0.2 to 10 MPa, preferably from 0.3 to 5 MPa and more preferably 0.5 to 2 MPa. When the pressure is 0.2 MPa or more, it is easy to obtain a good permeation rate and to suppress the increase of the membrane area. On the other hand, when the pressure is 10 MPa or less, the increase of the separation membrane strength for the purpose of withstanding the pressure applied to the separation membrane can be suppressed, and consequently a good permeation performance can be easily attained. On the other hand, although the permeate side pressure is preferably as small as possible from the viewpoint of the permeation performance, the permeate side pressure is determined by a comprehensive consideration of the power required for creating a reduced pressure (a pressure lower than atmospheric pressure), the pressure resistance of the membrane and other factors, and is in a range preferably from 0.0001 to 0.5 MPa and more preferably from 0.001 to atmospheric pressure.

A temperature at which the membrane separation is carried out is set at a temperature appropriate to the membrane material used; for example, for a palladium membrane, a temperature from 250 to 500° C. is preferable, and for a polyimide membrane, a temperature from room temperature to about 150° C. is preferable.

It is possible to increase the hydrogen recovery rate by recycling the gas enriched in hydrogen (second hydrogen-enriched gas) obtained in the hydrogen membrane-separating step to the inlet of the above-described PSA apparatus. On the other hand, the gas enriched in the components other than hydrogen (hydrogen separation membrane offgas) in the hydrogen membrane-separating step is transferred to a burner of the reformer to be combusted, and thus the thermal energy contained in the offgas can be effectively utilized.

[Process]

Hereinafter, with reference to one of the accompanying drawings, the preferred process for implementing the present aspect is described, but the present invention is not limited thereto.

Figure 4:
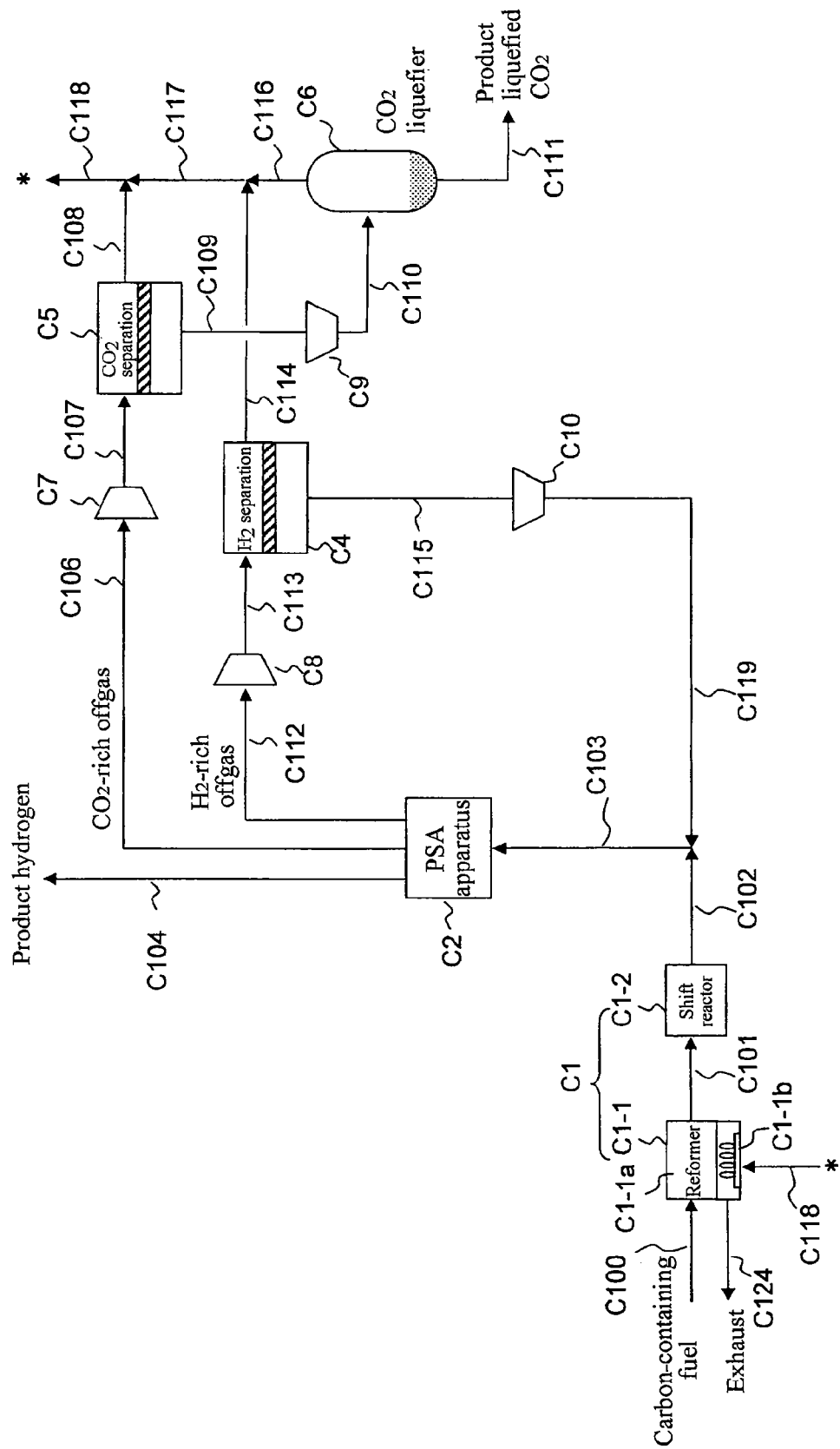
FIG. 4 is a flow diagram for illustrating an outline of an example of an apparatus capable of embodying an aspect C of the present invention.

As shown in FIG. 4, a hydrogen producing apparatus C1 includes a reformer C1-1 and a shift reactor C1-2 connected downstream of the reformer. The reformer includes a reforming reaction tube C1-1a and a burner C1-1b for externally heating the reaction tube. A carbon-containing fuel is fed from a line C100 to the reformer, in particular, to the reforming reaction tube. Steam, oxygen and the like necessary for the reforming reaction are also fed to the reformer (not shown) as appropriate. When the carbon-containing fuel is liquid or solid, the carbon-containing fuel may be beforehand vaporized as appropriate. Where necessary, the carbon-containing fuel may be fed to the reformer after the carbon-containing fuel has been desulfurized with a desulfurizer (not shown).

The carbon-containing fuel is reformed in the interior of the reforming reaction tube, and the reformed gas is discharged from the reformer (line C101). In the shift reactor, CO and steam in the reformed gas are converted into $CO_2$ and hydrogen.

The hydrogen-containing gas (line C102) obtained from the hydrogen producing apparatus is fed to a PSA apparatus C2 through a line C103. Specifically, the hydrogen-containing gas is fed into a PSA tower which is conducting the adsorption step, the components other than hydrogen contained in the hydrogen-containing gas are adsorbed on the adsorbent, and the hydrogen-enriched gas (first hydrogen-enriched gas) is taken out as a product hydrogen (line C104). On the other hand, from a PSA tower which is undergoing the regenerating step, a PSA offgas is discharged as separated into a hydrogen-rich offgas (line C112) and a $CO_2$-rich offgas (line C106).

The $CO_2$-rich gas is introduced into a $CO_2$ separation membrane C5 through the line C106, a pressure booster C7 and a line C107. A carbon dioxide-enriched gas (line C109) is obtained as a gas having permeated the carbon dioxide separation membrane, and this is boosted in pressure by a pressure booster C9 to be fed to a carbon dioxide liquefying apparatus C6 (line C110). A carbon dioxide separation membrane offgas (line C108) discharged without having permeated the carbon dioxide separation membrane is fed as a fuel to the burner C1-1b of the reformer through a line C118.

The product liquefied carbon dioxide is recovered (line C111) from the carbon dioxide liquefier. An unliquefied gas (line C116) which is discharged from the carbon dioxide liquefier and the hydrogen separation membrane offgas (line C114) merge together to form a combined gas (line C117), and further, the combined gas (line C117) and the carbon dioxide separation membrane offgas (line C108) merge together to be fed to the burner C1-1b from the line C118.

The combustible content in the gas fed from the line C118 is combusted in the burner C1-1b, and the combustion gas is discharged from a line C124. The heat of combustion obtained is utilized for heating the reforming reaction tube.

The hydrogen-rich offgas (line C112) of the PSA apparatus C2 is fed to a hydrogen separation membrane C4 through a pressure booster C8 and a line C113. A second hydrogen-enriched gas is obtained as a gas having permeated the hydrogen separation membrane, and is recycled to the PSA apparatus (in particular, an adsorption tower which is performing adsorption) through a line C115, a pressure booster C10 and a line C119. The hydrogen separation membrane offgas (line C114) discharged without permeating the hydrogen separation membrane is transferred to the burner of the reformer as described above.

The gas produced by the reforming reaction of the carbon-containing fuel is a mixed gas that contains hydrogen and carbon dioxide, and further contains components such as methane and carbon monoxide. The PSA method is effective as a method for obtaining high-purity hydrogen from this mixed gas. However, it has not been easy to enhance the concentration of carbon dioxide in addition to the concentration of hydrogen. According to the present aspect, it is possible to produce high-purity hydrogen and to concentrate carbon dioxide by using a simple apparatus without imposing excessive load on the PSA apparatus.

According to the present invention, energy consumption can be suppressed when in parallel with the production of high-purity hydrogen, carbon dioxide in a form suitable for storage is produced, by using as raw materials carbon-containing fuels such as fossil fuels. Additionally, the hydrogen yield can also be improved. Moreover, with a relatively simple apparatus, the production of hydrogen and the recovery of carbon dioxide can be performed, and the increase of the system cost can also be suppressed. Accordingly, the present invention contributes to the realization of the hydrogen-dependent society and the prevention of the global warming.

According to the present invention, for example, high-purity hydrogen having a purity high enough to be supplied as fuel for fuel-cell vehicles can be obtained. On the other hand, carbon dioxide can be made to have such a concentration as suitable for recovering in a form of liquefied carbon dioxide that is a form suitable for underground storage and oceanic storage.

EXAMPLES

Example A1

For a process having the configuration shown in FIG. 1, a heat-mass balance was determined. To the reformer A1-1 which is packed with a Ni-based catalyst and allowed to conduct a steam reforming reaction at an outlet temperature of 830° C. under a pressure of 2 MPa, 215 kg/h of naphtha (line 100) and 946 kg/h of steam (not shown) are fed; successively, with the shift reactor A1-2 which is packed with a Fe—Cr-based catalyst and allowed to conduct a shift reaction at an inlet temperature of 360° C. and an outlet temperature of 425° C., a mixed gas (line A102) having a total flow rate of 54.2 kmol/h, a $CO_2$ concentration of 20.5%, a hydrogen concentration of 72.4% and a pressure of 2 MPa is obtained. The mixed gas is dewatered with a dewaterer (not shown), and thereafter, with the PSA apparatus A2, high-purity hydrogen (line A104) having a purity of 99.99% is obtained at a flow rate of 35.8 kmol/h. On the other hand, a mixed gas (line A105), which is the PSA offgas, having a $CO_2$ concentration of 52% and a hydrogen concentration of 30% is boosted in pressure to 1 MPa by the compressor A3 and introduced into a $CO_2$ separation membrane A4 provided with a membrane having a $CO_2$/hydrogen permeability coefficient ratio α of 30. The gas (line A108) on the permeate side of the $CO_2$ separation membrane has a $CO_2$ concentration of 94%; this gas is pressurized to about 8 MPa by a compressor A6 and then transferred to the $CO_2$ liquefier A7; thus a liquefied $CO_2$ flow (line A110) of 8.1 kmol/h is obtained. The gas (line A107) on the nonpermeate side of the $CO_2$ separation membrane is introduced, without changing the pressure thereof, into a hydrogen separation membrane A5 provided with a polyimide membrane having a $CO_2$/hydrogen permeability coefficient ratio α of 0.11. On the permeate side of the hydrogen separation membrane, a gas (line A111) having a hydrogen concentration of 91% and a pressure of 0.1 MPa is obtained at 3.5 kmol/h, and this gas is recycled upstream of the PSA apparatus A2 through a compressor A8. On the other hand, a gas stream (line A122) obtained by merging together a gas (line A121) on the nonpermeate side of the hydrogen separation membrane and an offgas (line A123) of the $CO_2$ liquefier is transferred to the burner A1-1b of the reformer to be utilized as fuel for the reformer. The energy consumed in the compressors of the present process is found to be 12.0 kW/kmol-recovered $CO_2$ and the recovery rate of carbon dioxide as liquefied $CO_2$ with reference to the $CO_2$ amount contained in the shift reactor outlet gas (line A102) is found to be 71%.

The permeability coefficient ratio α of the carbon dioxide separation membrane, the recovery amount of high-purity hydrogen, the recovery amount of carbon dioxide and the energy consumption (total amount) of the compressors per 1 kmol of the recovered liquefied carbon dioxide are shown in Table A1. The heat-mass balance is shown in Table A4.

Examples A2 to A4

In each of Examples A2 to A4, a heat-mass balance was determined in the same manner as in Example A1 except that the membrane (permeability coefficient ratio α) used for the $CO_2$ separation membrane apparatus A4 was altered. The permeability coefficient ratio α of the carbon dioxide separation membrane, the recovery amount of high-purity hydrogen, the recovery amount of carbon dioxide and the energy consumption (total amount) of the compressors are shown in Table A1.

TABLE A1

| Example | α of CO2 separation membrane | Recovered high-purity hydrogen, kmol/h | Recovered liquefied CO2, kmol/h | Energy consumed in compressors, kW/kmol-CO2 |
|---|---|---|---|---|
| A1 | 30 | 35.8 | 8.1 | 12.0 |
| A2 | 5 | 35.4 | 6.4 | 17.8 |
| A3 | 10 | 35.6 | 7.3 | 14.3 |
| A4 | 100 | 35.8 | 8.2 | 11.4 |

Comparative Example A1

A heat-mass balance was determined in the same manner as in Example A1 except that without using any hydrogen separation membrane and any $CO_2$ separation membrane, the PSA offgas (line A105) was directly introduced into the $CO_2$ liquefier A7 to be compressed and liquefied. Consequently, the energy consumed in the compressors was found to be 41 kW/kmol-$CO_2$ and the recovery rate of $CO_2$ as liquefied $CO_2$ was found to be only 35%.

Comparative Example A2

Without using any $CO_2$ separation membrane, the PSA offgas (line A106) boosted in pressure was fed to the hydrogen separation membrane A5, and the gas (line A121) on the nonpermeate side of the hydrogen separation membrane was directly introduced into the $CO_2$ liquefier A7 to be compressed and liquefied (the hydrogen separation membrane permeate gas, which was the second hydrogen-enriched gas, was boosted in pressure and recycled to the PSA apparatus). In the same manner as in Example A1 except for the above, a heat-mass balance was determined. Consequently, the energy consumed in the compressors was found to be 33 kW/kmol-$CO_2$ and the recovery rate of $CO_2$ as liquefied $CO_2$ was found to be only 39%.

Comparative Examples A3 to A6

In each of Examples A1 to A4, the PSA offgas was firstly introduced into the $CO_2$ separation membrane, successively the $CO_2$ separation membrane offgas was introduced into the hydrogen separation membrane, and the hydrogen separation membrane permeate gas was recycled as a PSA raw material. However, here, no hydrogen separation membrane was used, and accordingly, no recycling of the hydrogen separation membrane permeate gas as a PSA raw material was conducted. The $CO_2$ separation membrane offgas (line A107) was fed as fuel to the burner A1-1b. In the same manner as in Example A1 except for the above, Comparative Examples A3 to A6 were performed, wherein the permeability coefficient ratio α of the $CO_2$ separation membrane was varied as shown in Table A2, thus resulting in Comparative Examples A3 to A6. The results thus obtained are shown in Table A2. As can be seen from the results, Comparative Examples A3 to A6 are inferior in the hydrogen yield to Examples A1 to A4.

TABLE A2

| Comparative Example | α of CO2 separation membrane | Recovered high-purity hydrogen, kmol/h | Recovered liquefied CO2, kmol/h | Energy consumed in compressors, kW/kmol-CO2 |
|---|---|---|---|---|
| A3 | 5 | 33.8 | 6.7 | 15.3 |
| A4 | 10 | 33.8 | 7.5 | 12.1 |
| A5 | 30 | 33.8 | 8.3 | 10.0 |
| A6 | 100 | 33.8 | 8.5 | 9.5 |

Examples A5 to A8

In each of Examples A5 to A8, a heat-mass balance was determined in the same manner as in Example A1 except that the hydrogen separation membrane permeate gas was taken out to outside for the purpose of effective utilization thereof, instead of recycling the hydrogen separation membrane permeate gas upstream of the PSA apparatus. Herein, the permeability coefficient ratio α of the $CO_2$ separation membrane was varied as shown in Table A3, thus resulting in Examples A5 to A8. The results thus obtained are shown in Table A3.

When a gas having the composition of the second hydrogen-enriched gas, obtained in each of Examples A5 to A8 was bubbled into a solution of dimethyl itaconate containing methanol as solvent and a Pt/C catalyst (a catalyst in which platinum is supported on carbon particles), the production of dimethyl methylsuccinate was verified, and thus it was found that the second hydrogen-enriched gas can be used for the hydrogenation of olefin.

Example B1

For a process having the configuration shown in FIG. 2, a heat-mass balance was determined. To the reformer B1-1 which is packed with a Ni-based catalyst and allowed to conduct a steam reforming reaction at an outlet temperature of 830° C. under a pressure of 2 MPa, 215 kg/h of naphtha (line 100) and 946 kg/h of steam (not shown) are fed; successively, with the shift reactor B1-2 which is packed with a Fe—Cr-based catalyst and allowed to conduct a shift reaction at an inlet temperature of 360° C. and an outlet temperature of 425° C., a mixed gas (line B102) having a total flow rate of 54.2 kmol/h, a $CO_2$ concentration of 20.5%, a hydrogen concentration of 72.4% and a pressure of 2 MPa is obtained. The mixed gas is dewatered with a dewaterer (not shown), and thereafter, with the PSA apparatus B2, high-purity hydrogen (line B104) having a purity of 99.99% is obtained at a flow rate of 34.7 kmol/h. On the other hand, a mixed gas (line B105), which is the PSA offgas, having a $CO_2$ concentration of 53% and a hydrogen concentration of 29% is boosted in pressure to 1 MPa by the compressor B3 and introduced into the hydrogen separation membrane B4 provided with a polyimide membrane having a $CO_2$/hydrogen permeability coefficient ratio α of 0.11. On the permeate side of the hydrogen separation membrane, a gas (line B111) having a hydrogen concentration of 76% and a pressure of 0.1 MPa is obtained at 2.5 kmol/h, and this gas is recycled upstream of the PSA apparatus B2 through the compressor B8. The gas (line B107) on the nonpermeate side of the hydrogen separation membrane is introduced, without changing the pressure thereof,

TABLE A3

| Example | α of CO2 separation membrane | Recovered high-purity hydrogen, kmol/h | Recovered liquefied CO2, kmol/h | Energy consumed in compressors, kW/kmol-CO2 | Recovered second hydrogen-enriched gas, kmol/h | Hydrogen purity of second hydrogen-enriched gas, % |
|---|---|---|---|---|---|---|
| A5 | 5 | 33.8 | 6.7 | 15.3 | 2.6 | 89 |
| A6 | 10 | 33.8 | 7.5 | 12.1 | 2.9 | 90 |
| A7 | 30 | 33.8 | 8.3 | 10.0 | 3.1 | 91 |
| A8 | 100 | 33.8 | 8.5 | 9.5 | 3.2 | 91 |

TABLE A4

Results of the heat-mass balance of Example A1

| | | Line No. | | | | | | | | |
|---|---|---|---|---|---|---|---|---|---|---|
| | | 102 Shift outlet | 103 PSA inlet | 104 Product hydrogen | 105 PSA offgas | 106 CO2 separation membrane inlet | 108 CO2 separation membrane permeate gas | 109 CO2 liquefier inlet | 107 CO2 separation membrane offgas | 111 H2 separation membrane permeate gas |
| Pressure | MPa | 2 | 2 | 2 | 0.1 | 1 | 0.1 | 7.9 | 1 | 0.1 |
| Total flow rate | kmol/h | 54.2 | 57.7 | 35.8 | 21.9 | ← | 8.9 | ← | 13.0 | 3.5 |
| CO2 | mol % | 20.5% | 19.8% | 0.0% | 52.0% | ← | 94.3% | ← | 23.2% | 8.1% |
| CO | mol % | 4.0% | 3.8% | 0.0% | 9.9% | ← | 0.7% | ← | 16.2% | 0.3% |
| H2 | mol % | 72.4% | 73.5% | 100.0% | 30.4% | ← | 4.5% | ← | 48.0% | 91.4% |
| CH4 | mol % | 3.1% | 2.9% | 0.0% | 7.7% | ← | 0.5% | ← | 12.6% | 0.2% |

Note)
In the table, "A" to be attached to each of the line numbers is omitted. For example, in the table, the line No. 102 means the line No. A102.

into the $CO_2$ separation membrane B5 provided with a membrane having a $CO_2$/hydrogen permeability coefficient ratio α of 30. The gas (line B108) on the permeate side of the $CO_2$ separation membrane has a $CO_2$ concentration of 95%; this gas is pressurized to about 8 MPa by the compressor B6 and then transferred to the $CO_2$ liquefier B7; thus a liquefied $CO_2$ stream (line B110) of 8.7 kmol/h is obtained. On the other hand, a gas stream (line B122) obtained by merging together the gas (line B121) on the nonpermeate side of the $CO_2$ separation membrane and the offgas (line B123) of the $CO_2$ liquefier is transferred to the burner B1-1b of the reformer to be utilized as fuel for the reformer. The energy consumed in the compressors of the present process is found to be 10.9 kW/kmol-recovered $CO_2$ and the recovery rate of carbon dioxide as liquefied $CO_2$ with reference to the $CO_2$ amount contained in the shift reactor outlet gas (line B102) is found to be 75%.

The permeability coefficient ratio α of the carbon dioxide separation membrane, the recovery amount of high-purity hydrogen, the recovery amount of carbon dioxide and the energy consumption (total amount) of the compressors per 1 kmol of the recovered liquefied carbon dioxide are shown in Table B1. The heat-mass balance is shown in Table B4.

Examples B2 to B4

In each of Examples B2 to B4, a heat-mass balance was determined in the same manner as in Example B1 except that the membrane (permeability coefficient ratio α) used for the $CO_2$ separation membrane apparatus B5 was altered. The permeability coefficient ratio α of the carbon dioxide separation membrane, the recovery amount of high-purity hydrogen, the recovery amount of carbon dioxide and the energy consumption (total amount) of the compressors are shown in Table B1.

TABLE B1

| Example | α of CO2 separation membrane | Recovered high-purity hydrogen, kmol/h | Recovered liquefied CO2, kmol/h | Energy consumed in compressors, kW/kmol-CO2 |
|---|---|---|---|---|
| B1 | 30 | 34.7 | 8.7 | 10.9 |
| B2 | 5 | 34.7 | 7.1 | 16.0 |
| B3 | 10 | 34.7 | 8.0 | 12.9 |
| B4 | 100 | 34.7 | 8.8 | 10.5 |

Example B5 to B8

In each of Examples B1 to B4, the second hydrogen-enriched gas obtained on the permeate side of the hydrogen separation membrane B4 provided with a polyimide membrane was recycled upstream of the PSA apparatus B2. However, here, the second hydrogen-enriched gas was not recycled, but used as fuel for the burner of the reformer. In the same manner as in Example B1 except for the above, Examples B5 to B8 were performed, wherein the permeability coefficient ratio α of the $CO_2$ separation membrane was varied as shown in Table B2, thus resulting in Examples B5 to B8. For each of Examples B5 to B8, the permeability coefficient ratio α of the carbon dioxide separation membrane, the recovery amount of high-purity hydrogen, the recovery amount of carbon dioxide and the energy consumption (total amount) of the compressors are shown in Table B2; as compared to Table B1 where hydrogen was recycled, the energy consumed in the compressors is smaller, but the recovery amount of high-purity hydrogen and the recovery amount of liquefied $CO_2$ are somewhat smaller.

TABLE B2

| Example | α of CO2 separation membrane | Recovered high-purity hydrogen, kmol/h | Recovered liquefied CO2, kmol/h | Energy consumed in compressors, kW/kmol-CO2 |
|---|---|---|---|---|
| B5 | 5 | 33.8 | 6.9 | 14.6 |
| B6 | 10 | 33.8 | 7.8 | 11.7 |
| B7 | 30 | 33.8 | 8.6 | 7.9 |
| B8 | 100 | 33.8 | 8.6 | 8.5 |

Comparative Example B1

A heat-mass balance was determined in the same manner as in Example B1 except that without using any hydrogen separation membrane and any $CO_2$ separation membrane, the PSA offgas (line B105) was directly introduced into the $CO_2$ liquefier B7 to be compressed and liquefied. Consequently, the energy consumed in the compressors was found to be 41 kW/kmol-$CO_2$ and the recovery rate of $CO_2$ as liquefied $CO_2$ was found to be only 35%.

Comparative Example B2

A heat-mass balance was determined in the same manner as in Example B1 except that without using any $CO_2$ separation membrane, the gas (line B107) on the nonpermeate side of the hydrogen separation membrane was directly compressed and liquefied with a $CO_2$ liquefier B7. Consequently, the energy consumed in the compressors was found to be 33 kW/kmol-$CO_2$ and the recovery rate of $CO_2$ as liquefied $CO_2$ was found to be only 39%.

Comparative Examples B3 to B6

In each of Examples B5 to B8, the PSA offgas was firstly introduced into the hydrogen separation membrane, successively the hydrogen separation membrane offgas was introduced into the $CO_2$ separation membrane, and the hydrogen separation membrane permeate gas was used as fuel for the burner of the reformer.

Here, without using any hydrogen separation membrane, the PSA offgas was directly introduced into the $CO_2$ separation membrane. In other words, in each of Comparative Examples B3 to B6, the PSA offgas was directly introduced into the $CO_2$ separation membrane. Accordingly, no recycling of the hydrogen separation membrane permeate gas was conducted. In the same manner as in Examples B5 to B8 except for the above, Comparative Examples B3 to B6 were performed, wherein the permeability coefficient ratio α of the $CO_2$ separation membrane was varied as shown in Table B3, thus resulting in Comparative Examples B3 to B6. The results thus obtained are shown in Table B3. Comparative Examples B3 to B6 are inferior both in the energy consumption and in the recovery rate of $CO_2$ to Examples B5 to B8.

TABLE B3

| Comparative Example | α of CO2 separation membrane | Recovered high-purity hydrogen, kmol/h | Recovered liquefied CO2, kmol/h | Energy consumed in compressors, kW/kmol-CO2 |
|---|---|---|---|---|
| B3 | 5 | 33.8 | 6.7 | 15.3 |
| B4 | 10 | 33.8 | 7.5 | 12.1 |
| B5 | 30 | 33.8 | 8.3 | 10.0 |
| B6 | 100 | 33.8 | 8.5 | 9.5 |

TABLE B4

Results of the heat-mass balance of Example B1

| | | 102 Shift outlet | 103 PSA inlet | 104 Product hydrogen | 105 PSA offgas | 106 H2 separation membrane inlet | 111 H2 separation membrane permeate gas | 107 H2 separation membrane offgas | 108 CO2 separation membrane permeate gas | 109 CO2 liquefier inlet |
|---|---|---|---|---|---|---|---|---|---|---|
| Pressure | MPa | 2 | 2 | 2 | 0.1 | 1 | 0.1 | 1 | 0.1 | 7.9 |
| Total flow rate | kmol/h | 54.2 | 56.7 | 34.7 | 21.9 | ← | 2.5 | 19.4 | 9.4 | ← |
| CO2 | mol % | 20.5% | 20.7% | 0.0% | 53.4% | ← | 23.8% | 57.2% | 95.1% | ← |
| CO | mol % | 4.0% | 3.8% | 0.0% | 9.9% | ← | 0.2% | 11.2% | 0.8% | ← |
| H2 | mol % | 72.4% | 72.5% | 100.0% | 29.0% | ← | 75.8% | 23.0% | 3.4% | ← |
| CH4 | mol % | 3.1% | 3.0% | 0.0% | 7.7% | ← | 0.2% | 8.7% | 0.6% | ← |

Note)
In the table, "B" to be attached to each of the line numbers is omitted. For example, in the table, the line No. 102 means the line No. B102.

Example C1

For a process having the configuration shown in FIG. 4, a heat-mass balance was determined. To the reformer C11-1 which is packed with a Ni-based catalyst and allowed to conduct a steam reforming reaction at an outlet temperature of 830° C. under a pressure of 2 MPa, 215 kg/h of naphtha (line 100) and 946 kg/h of steam (not shown) are fed; successively, with the shift reactor C1-2 which was packed with a Fe—Cr-based catalyst and allowed to conduct a shift reaction at an inlet temperature of 360° C. and an outlet temperature of 425° C., a mixed gas (line C102) having a total flow rate of 54.2 kmol/h, a $CO_2$ concentration of 20.5%, a hydrogen concentration of 72.4% and a pressure of 2 MPa is obtained. The mixed gas is dewatered with a dewaterer (not shown), thereafter the adsorption step is performed with the four-tower PSA apparatus C2, and high-purity hydrogen (line C104) having a purity of 99.99% is obtained at a flow rate of 35.9 kmol/h. The pressure at this time is the same value of 2 MPa as the pressure of the mixed gas (line C102).

In the high-pressure desorption step, the interior of the tower is decreased in pressure down to atmospheric pressure, when a first hydrogen-rich offgas is obtained. Further, by reducing pressure inside the tower in the low-pressure desorption step, a $CO_2$-rich offgas (line C106) is obtained. Successively, the interior of the tower is cleaned with a gas obtained by reducing, in pressure down to 0.2 MPa, a portion of the product high-purity hydrogen, when as an offgas a second hydrogen-rich offgas is obtained. The first and second hydrogen-rich offgases are mixed together to be a hydrogen-rich offgas (line C112) having a $CO_2$ concentration of 19%, a hydrogen concentration of 80% and a flow rate of 7.4 kmol/h. This gas is boosted in pressure to 1 MPa by the compressor C8 and introduced into the hydrogen separation membrane C4 provided with a polyimide membrane having a $CO_2$/hydrogen permeability coefficient ratio α of 0.11. On the permeate side of the hydrogen separation membrane, a gas (line C115) having a hydrogen concentration of 96% and a pressure of 0.1 MPa is obtained at 3.5 kmol/h, and this gas is recycled upstream of the PSA apparatus C2 through a compressor C10. The gas (line C114) on the nonpermeate side of the hydrogen separation membrane was transferred to the burner of the reformer.

Among the PSA offgases, the above-described $CO_2$-rich offgas (line C106) having a $CO_2$ concentration of 69%, a hydrogen concentration of 5% and a flow rate of 14.3 kmol/h is boosted in pressure to 1 MPa by the pressure booster C7 and introduced into the $CO_2$ separation membrane C5 provided with a membrane having a $CO_2$/hydrogen permeability coefficient ratio α of 30.

The gas (line C109) on the permeate side of the $CO_2$ separation membrane has a $CO_2$ concentration of 95%, pressurized by the compressor C9 to a liquefaction pressure of $CO_2$ (about 8 MPa in the case of present Example) and thereafter transferred to the $CO_2$ liquefier C6, and thus a liquefied $CO_2$ stream (line C111) of 9.5 kmol/h is obtained. On the other hand, the $CO_2$ separation membrane offgas (nonpermeate side gas) (line C108), the hydrogen separation membrane offgas (nonpermeate side gas) (line C114) and the $CO_2$ liquefier offgas (line C116) are merged together to form a gas stream (line C118), which is transferred to the burner C1-1b of the reformer to be used as fuel.

The energy consumed in the compressors of the present process (per 1 kmol of the recovered liquefied carbon dioxide) was found to be 10.8 kW/kmol-recovered $CO_2$ and the recovery rate of carbon dioxide as liquefied $CO_2$ with reference to the $CO_2$ amount contained in the shift reactor outlet gas (line C102) was found to be 85%.

The permeability coefficient ratio α of the carbon dioxide separation membrane, the recovery amount of high-purity hydrogen, the recovery amount of carbon dioxide and the energy consumption (total amount) of the compressors per 1 kmol of the recovered liquefied carbon dioxide are shown in Table C1. The heat-mass balance is shown in Table C4.

Examples C2 to C4

In each of Examples C2 to C4, a heat-mass balance was determined in the same manner as in Example C1 except that the membrane (permeability coefficient ratio α) used for the $CO_2$ separation membrane apparatus C5 was altered. The permeability coefficient ratio α of the carbon dioxide separation membrane, the recovery amount of high-purity hydrogen, the recovery amount of carbon dioxide and the energy consumption (total amount) of the compressors are shown in Table C1.

TABLE C1

| Example | α of CO2 separation membrane | Recovered high-purity hydrogen, kmol/h | Recovered liquefied CO2, kmol/h | Energy consumed in compressors, kW/kmol-CO2 |
|---|---|---|---|---|
| C1 | 30 | 35.9 | 9.5 | 10.8 |
| C2 | 5 | 35.9 | 9.0 | 11.6 |
| C3 | 10 | 35.9 | 9.2 | 11.3 |
| C4 | 100 | 35.9 | 9.7 | 10.4 |

Examples C5 to C8

Figure 5:
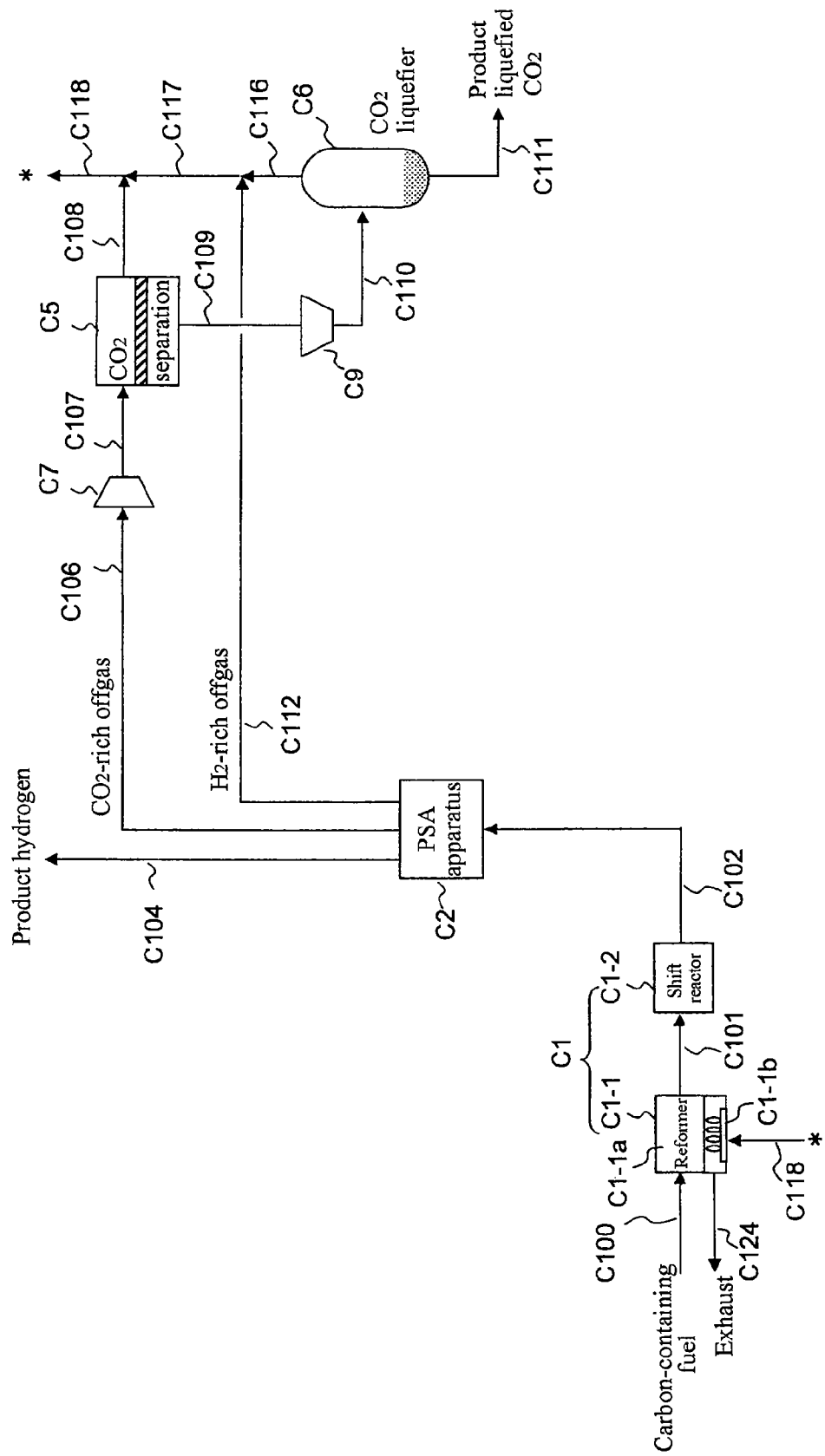
FIG. 5 is a flow diagram for illustrating an outline of another example of an apparatus capable of embodying the aspect C of the present invention.

In each of Examples C1 to C4, the second hydrogen-enriched gas obtained on the permeate side of the hydrogen separation membrane C4 provided with a polyimide membrane was recycled upstream of the PSA apparatus C2. However, here, no hydrogen separation membrane C4 was used, and the hydrogen-rich offgas among the PSA offgases was used as it was as fuel for the burner of the reformer. In other words, a heat-mass balance was determined on the process as shown in FIG. 5 in which from the process configuration shown in FIG. 4, the pressure booster C8 and the hydrogen separation membrane C4 were removed, and also the recycle line C119 and the pressure booster C10 were removed, wherein the permeability coefficient ratio α of the $CO_2$ separation membrane was varied as shown in Table C2, thus resulting in Examples C5 to C8. For each of Examples C5 to C8, the permeability coefficient ratio α of the carbon dioxide separation membrane, the recovery amount of high-purity hydrogen, the recovery amount of carbon dioxide and the energy consumption (total amount) of the compressors are shown in Table C2; as compared to Table C1 where hydrogen was recycled, the energy consumed in the compressors is smaller, but the recovery amount of high-purity hydrogen and the recovery amount of liquefied $CO_2$ are somewhat smaller.

Additionally, for Example C7, the heat-mass balance is shown in Table C5.

TABLE C2

| Example | α of CO2 separation membrane | Recovered high-purity hydrogen, kmol/h | Recovered liquefied CO2, kmol/h | Energy consumed in compressors, kW/kmol-CO2 |
|---|---|---|---|---|
| C5 | 5 | 33.8 | 8.9 | 10.1 |
| C6 | 10 | 33.8 | 9.1 | 9.8 |

TABLE C2-continued

| Example | α of CO2 separation membrane | Recovered high-purity hydrogen, kmol/h | Recovered liquefied CO2, kmol/h | Energy consumed in compressors, kW/kmol-CO2 |
|---|---|---|---|---|
| C7 | 30 | 33.8 | 9.4 | 9.4 |
| C8 | 100 | 33.8 | 9.5 | 9.1 |

Comparative Examples C1 to C4

Figure 6:
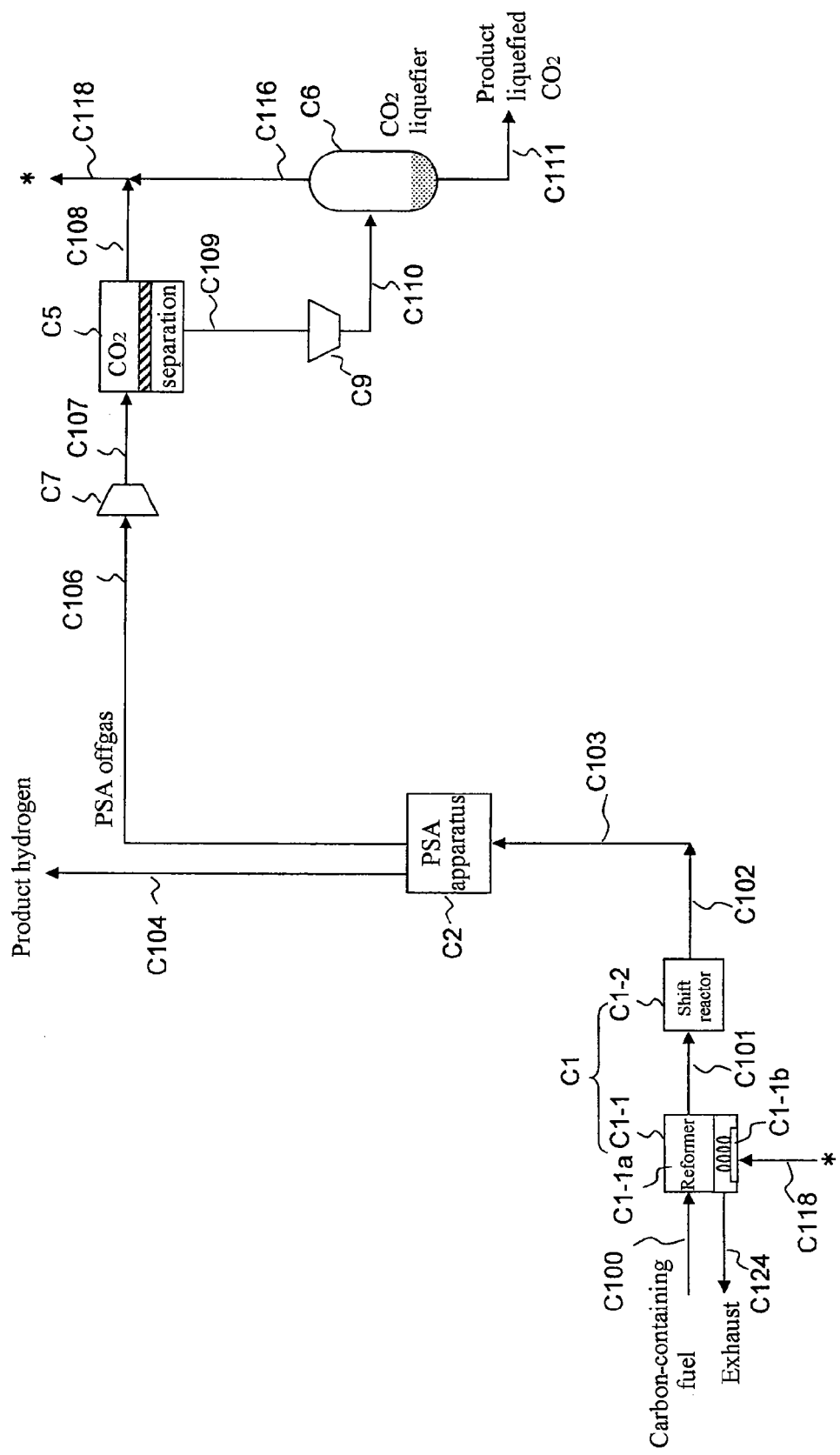
FIG. 6 is a flow diagram for illustrating the process in Comparative Examples C1 to C4.

For the process shown in FIG. 6, a heat-mass balance was determined. In each of Examples C1 to C8, the desorption step was divided into the high-pressure desorption step and the low-pressure desorption step, the PSA offgas ($CO_2$-rich offgas) obtained from the low-pressure desorption step was treated with the $CO_2$ separation membrane, but the PSA offgas (hydrogen-rich offgas) obtained from the high-pressure desorption step and the cleaning step was not treated with the $CO_2$ separation membrane. In contrast, in the process shown in FIG. 6, the desorption step was not divided into the high-pressure desorption step and the low-pressure desorption step, the PSA offgases obtained in the regenerating step were merged together to be fed to the $CO_2$ separation membrane, and the $CO_2$ separation membrane offgas (line C108) was fed as fuel to the burner C1-1b. In the same manner as in Example C5 except for the above, Comparative Examples C1 to C4 were performed, wherein the permeability coefficient ratio α of the $CO_2$ separation membrane was varied as shown in Table C3, thus resulting in Comparative Examples C1 to C4. The results thus obtained are shown in Table C3. As compared to Examples C5 to C8 (no hydrogen separation membrane was used, no recycling of hydrogen was conducted, but the PSA offgases were obtained as divided), Comparative Examples C1 to C4 are the same in the hydrogen yield, but are smaller in the recovery amount of the liquefied $CO_2$; additionally, the energy consumed in the compressors is needed in a larger amount, and this is remarkable particularly when a $CO_2$ separation membrane small in α and not high in separation performance is used.

TABLE C3

| Comparative Example | α of CO2 separation membrane | Recovered high-purity hydrogen, kmol/h | Recovered liquefied CO2, kmol/h | Energy consumed in compressors, kW/kmol-CO2 |
|---|---|---|---|---|
| C1 | 5 | 33.8 | 6.7 | 15.3 |
| C2 | 10 | 33.8 | 7.5 | 12.1 |
| C3 | 30 | 33.8 | 8.3 | 10.0 |
| C4 | 100 | 33.8 | 8.5 | 9.5 |

TABLE C4

Results of the heat-mass balance of Example C1

| | | 102 Shift outlet | 103 PSA inlet | 104 Product hydrogen | 106 PSA CO2-rich offgas | 107 CO2 separation membrane inlet | 109 CO2 separation membrane permeate gas | 110 CO2 liquefier inlet | 108 CO2 separation membrane offgas | 112 PSA H2-rich offgas | 113 H2 separation membrane inlet | 115 H2 separation membrane permeate gas | 114 H2 separation membrane offgas |
|---|---|---|---|---|---|---|---|---|---|---|---|---|---|
| Pressure | MPa | 2 | 2 | 2 | 0.1 | 1 | 0.1 | 7.9 | 1 | 0.1 | 1 | 0.1 | 1 |
| Total flow | kmol/h | 54.2 | 57.6 | 35.9 | 14.3 | ← | 10.2 | ← | 4.0 | 7.4 | ← | 3.5 | 4.0 |

TABLE C4-continued

Results of the heat-mass balance of Example C1

| | | 102 Shift outlet | 103 PSA inlet | 104 Product hydrogen | 106 PSA CO2-rich offgas | 107 CO2 separation membrane inlet | 109 CO2 separation membrane permeate gas | 110 CO2 liquefier inlet | 108 CO2 separation membrane offgas | 112 PSA H2-rich offgas | 113 H2 separation membrane inlet | 115 H2 separation membrane permeate gas | 114 H2 separation membrane offgas |
|---|---|---|---|---|---|---|---|---|---|---|---|---|---|
| rate | | | | | | | | | | | | | |
| CO2 | mol % | 20.5% | 19.5% | 0.0% | 69.0% | ← | 95.0% | ← | 3.2% | 18.7% | ← | 3.9% | 31.7% |
| CO | mol % | 4.0% | 3.8% | 0.0% | 14.7% | ← | 1.4% | ← | 48.3% | 0.9% | ← | 0.0% | 1.8% |
| H2 | mol % | 72.4% | 73.8% | 100.0% | 4.8% | ← | 2.4% | ← | 11.0% | 79.6% | ← | 96.0% | 65.2% |
| CH4 | mol % | 3.1% | 2.9% | 0.0% | 11.4% | ← | 1.1% | ← | 37.5% | 0.7% | ← | 0.0% | 1.4% |

Note)
In the table, "C" to be attached to each of the line numbers is omitted. For example, in the table, the line No. 102 means the line No. C102.

TABLE C5

Results of the heat-mass balance of Example C7

| | | 102 Shift outlet (PSA inlet) | 104 Product hydrogen | 106 PSA CO2-rich offgas | 107 CO2 separation membrane inlet | 109 CO2 separation membrane permeate gas | 110 CO2 liquefier inlet | 108 CO2 separation membrane offgas | 112 PSA H2-rich offgas |
|---|---|---|---|---|---|---|---|---|---|
| Pressure | MPa | 2 | 2 | 0.1 | 1 | 0.1 | 7.9 | 1 | 0.1 |
| Total flow rate | kmol/h | 54.2 | 33.8 | 14.3 | ← | 10.1 | ← | 4.0 | 7.4 |
| CO2 | mol % | 20.5% | 0.0% | 69.0% | ← | 95.1% | ← | 3.3% | 18.7% |
| CO | mol % | 4.0% | 0.0% | 14.7% | ← | 1.5% | ← | 48.8% | 0.9% |
| H2 | mol % | 72.4% | 100.0% | 4.8% | ← | 2.3% | ← | 10.0% | 79.6% |
| CH4 | mol % | 3.1% | 0.0% | 11.4% | ← | 1.1% | ← | 37.9% | 0.7% |

Note)
In the table, "C" to be attached to each of the line numbers is omitted. For example, in the table, the line No. 102 means the line No. C102.

INDUSTRIAL APPLICABILITY

The present invention is to be suitably used for the purpose of producing high-purity hydrogen and at the same time recovering high-concentration carbon dioxide. The produced hydrogen is suitable as the fuel for fuel cells and the like, and the recovered carbon dioxide is suitable for underground and undersea storage. Additionally, relatively high-purity hydrogen can also be obtained as a by-product, which can be used for synthesis reactions such as hydrogenation of organic compounds.

DESCRIPTION OF SYMBOLS

A1: Hydrogen producing apparatus
A1-1: Reformer
A1-1a: Reforming reaction tube
A1-1b: Burner
A1-2: Shift reactor
A2: PSA apparatus
A3: Pressure booster
A4: Carbon dioxide separation membrane
A5: Hydrogen separation membrane
A6: Pressure booster
A7: Carbon dioxide liquefier
A8: Pressure booster
B1: Hydrogen producing apparatus
B1-1: Reformer
B1-1a: Reforming reaction tube
B1-1b: Burner
B1-2: Shift reactor
B2: PSA apparatus
B3: Pressure booster
B4: Hydrogen separation membrane
B5: Carbon dioxide separation membrane
B6: Pressure booster
B7: Carbon dioxide liquefier
B8: Pressure booster
C1: Hydrogen producing apparatus
C1-1: Reformer
C1-1a: Reforming reaction tube
C1-1b: Burner
C1-2: Shift reactor
C2: PSA apparatus
C4: Hydrogen separation membrane
C5: Carbon dioxide separation membrane
C6: Carbon dioxide liquefier
C7, C8, C9, C10: Pressure booster
A, B, C, D: Adsorption tower
P: Vacuum pump

The invention claimed is:
1. A method for producing hydrogen and recovering carbon dioxide which method produces hydrogen from a carbon- containing fuel and recovers carbon dioxide, the method comprising the combination of steps of:
- a hydrogen-containing gas producing step of obtaining a hydrogen-containing gas that contains hydrogen and carbon dioxide by reforming a carbon-containing fuel;
- a PSA step of separating the hydrogen-containing gas with the use of a pressure swing adsorption apparatus into a first hydrogen-enriched gas that is a gas enriched in hydrogen and a PSA offgas that is a gas enriched in the components other than hydrogen;
- a carbon dioxide membrane-separating step of separating the PSA offgas with the use of a carbon dioxide separation membrane into a carbon dioxide-enriched gas that is a gas enriched in carbon dioxide and a carbon dioxide separation membrane offgas that is a gas enriched in the components other than carbon dioxide;
- a hydrogen membrane-separating step of separating the carbon dioxide separation membrane offgas with the use of a hydrogen separation membrane into a second hydrogen-enriched gas that is a gas enriched in hydrogen and a hydrogen separation membrane offgas that is a gas enriched in the components other than hydrogen; and
- a step of obtaining liquefied carbon dioxide by liquefying the carbon dioxide-enriched gas.

2. The method claim 1 comprising a step of recycling the second hydrogen-enriched gas to the hydrogen-containing gas producing step or to the PSA step.

3. The method of claim 1, wherein the ratio α of the carbon dioxide permeability coefficient to the hydrogen permeability coefficient of the carbon dioxide separation membrane is 5 or more.

4. An apparatus for producing hydrogen and recovering carbon dioxide which apparatus produces hydrogen from a carbon-containing fuel and recovers carbon dioxide, the apparatus comprising:
- a hydrogen-containing gas producing apparatus for obtaining a hydrogen-containing gas that contains hydrogen and carbon dioxide by reforming a carbon-containing fuel;
- a pressure swing adsorption apparatus for separating the hydrogen-containing gas into a first hydrogen-enriched gas that is a gas enriched in hydrogen and a PSA offgas that is a gas enriched in the components other than hydrogen;
- a carbon dioxide separation membrane for separating the PSA offgas into a carbon dioxide-enriched gas that is a gas enriched in carbon dioxide and a carbon dioxide separation membrane offgas that is a gas enriched in the components other than carbon dioxide;
- a hydrogen separation membrane for separating the carbon dioxide separation membrane offgas into a second hydrogen-enriched gas that is a gas enriched in hydrogen and a hydrogen separation membrane offgas that is a gas enriched in the components other than hydrogen; and
- a carbon dioxide liquefier for obtaining liquefied carbon dioxide by liquefying the carbon dioxide-enriched gas.

5. The apparatus of claim 4, comprising a recycle line for recycling the second hydrogen-enriched gas to the hydrogen-containing gas producing step or to the PSA step.

6. The apparatus of claim 4, wherein the ratio α of the carbon dioxide permeability coefficient to the hydrogen permeability coefficient of the carbon dioxide separation membrane is 5 or more.

7. A method for producing hydrogen and recovering carbon dioxide which method produces hydrogen from a carbon-containing fuel and recovers carbon dioxide, the method comprising the combination of steps of:
- a hydrogen-containing gas producing step of obtaining a hydrogen-containing gas that contains hydrogen and carbon dioxide by reforming a carbon-containing fuel;
- a PSA step of separating the hydrogen-containing gas with the use of a pressure swing adsorption apparatus into a first hydrogen-enriched gas that is a gas enriched in hydrogen and a PSA offgas that is a gas enriched in the components other than hydrogen;
- a hydrogen membrane-separating step of separating the PSA offgas with the use of a hydrogen separation membrane into a second hydrogen-enriched gas that is a gas enriched in hydrogen and a hydrogen separation membrane offgas that is a gas enriched in the components other than hydrogen;
- a carbon dioxide membrane-separating step of separating the hydrogen separation membrane offgas with the use of a carbon dioxide separation membrane into a carbon dioxide-enriched gas that is a gas enriched in carbon dioxide and a carbon dioxide separation membrane offgas that is a gas enriched in the components other than carbon dioxide; and
- a step of obtaining liquefied carbon dioxide by liquefying the carbon dioxide-enriched gas.

8. The method of claim 7, comprising a step of recycling the second hydrogen-enriched gas to the hydrogen-containing gas producing step or to the PSA step.

9. The method of claim 7, wherein the ratio α of the carbon dioxide permeability coefficient to the hydrogen permeability coefficient of the carbon dioxide separation membrane is 5 or more.

10. The method of claim 7, wherein the ratio α of the carbon dioxide permeability coefficient to the hydrogen permeability coefficient of the carbon dioxide separation membrane is 100 or less.

11. An apparatus for producing hydrogen and recovering carbon dioxide which apparatus produces hydrogen from a carbon-containing fuel and recovers carbon dioxide, the apparatus comprising:
- a hydrogen-containing gas producing apparatus for obtaining a hydrogen-containing gas that contains hydrogen and carbon dioxide by reforming a carbon-containing fuel;
- a pressure swing adsorption apparatus for separating the hydrogen-containing gas into a first hydrogen-enriched gas that is a gas enriched in hydrogen and a PSA offgas that is a gas enriched in the components other than hydrogen;
- a hydrogen separation membrane for separating the PSA offgas into a second hydrogen-enriched gas that is a gas enriched in hydrogen and a hydrogen separation membrane offgas that is a gas enriched in the components other than hydrogen;
- a carbon dioxide separation membrane for separating the hydrogen separation membrane offgas into a carbon dioxide-enriched gas that is a gas enriched in carbon dioxide and a carbon dioxide separation membrane offgas that is a gas enriched in the components other than carbon dioxide; and
- a carbon dioxide liquefier for obtaining liquefied carbon dioxide by liquefying the carbon dioxide-enriched gas.

12. The apparatus of claim 11, comprising a recycle line for recycling the second hydrogen-enriched gas to the inlet of the hydrogen-containing gas producing apparatus or to the inlet of the PSA apparatus.

13. The apparatus of claim 11, wherein the ratio α of the carbon dioxide permeability coefficient to the hydrogen permeability coefficient of the carbon dioxide separation membrane is 5 or more.

14. The apparatus of claim 11 wherein the ratio α of the carbon dioxide permeability coefficient to the hydrogen permeability coefficient of the carbon dioxide separation membrane is 100 or less.

15. A method for producing hydrogen and recovering carbon dioxide which method produces hydrogen from a carbon-containing fuel and recovers carbon dioxide, the method comprising the combination of steps of:
- a hydrogen-containing gas producing step of obtaining a hydrogen-containing gas that contains hydrogen and carbon dioxide by reforming a carbon-containing fuel;
- a adsorption step of adsorbing, with the use of a pressure swing adsorption apparatus provided with an adsorption tower containing an adsorbent, the components other than hydrogen contained in the hydrogen-containing gas on the adsorbent to yield a hydrogen-enriched gas that is enriched in hydrogen;
- a high-pressure desorption step of desorbing the components adsorbed on the adsorbent under a relatively high pressure;
- a low-pressure desorption step of desorbing the components adsorbed on the adsorbent under a relatively low pressure;
- a carbon dioxide membrane-separating step of separating the gas obtained from the low-pressure desorption step with the use of a carbon dioxide separation membrane into a carbon dioxide-enriched gas that is a gas enriched in carbon dioxide and a carbon dioxide separation membrane offgas that is a gas enriched in the components other than carbon dioxide; and
- a cleaning step of cleaning the interior of the adsorption tower having completed the low-pressure desorption step with the use of the hydrogen-enriched gas obtained from the adsorption step.

16. The method of claim 15, comprising a mixing step of mixing together the gas obtained from the high-pressure desorption step and the gas obtained from the cleaning step to yield a mixed gas.

17. The method of claim 15, wherein combustion heat generated by combusting the gas obtained from the high-pressure desorption step is utilized for the reforming in the hydrogen-containing gas producing step.

18. The method of claim 15, wherein combustion heat generated by combusting the gas obtained from the cleaning step is utilized for the reforming in the hydrogen-containing gas producing step.

19. The method of claim 16, wherein combustion heat generated by combusting the mixed gas is utilized for the reforming in the hydrogen-containing gas producing step.

20. The method of claim 15, comprising a recycling step of recycling the gas obtained from the high-pressure desorption step to the adsorption step.

21. The method of claim 20, wherein in the recycling step, the gas obtained from the high-pressure desorption step is increased in the hydrogen concentration with the use of a hydrogen separation membrane, and thereafter recycled to the adsorption step.

22. The method of claim 15, wherein the ratio α of the carbon dioxide permeability coefficient to the hydrogen permeability coefficient of the carbon dioxide separation membrane is 5 or more.

* * * * *